US008403492B2

(12) United States Patent
Shibasaki

(10) Patent No.: US 8,403,492 B2
(45) Date of Patent: Mar. 26, 2013

(54) LIGHT SOURCE DEVICE, VIDEO PROJECTOR AND VIDEO PROJECTION METHOD

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 295 days.

(21) Appl. No.: 12/824,532

(22) Filed: Jun. 28, 2010

(65) Prior Publication Data
US 2010/0328554 A1    Dec. 30, 2010

(30) Foreign Application Priority Data

Jun. 30, 2009  (JP) ................. P2009-156091

(51) Int. Cl.
    *G03B 21/00* (2006.01)
(52) U.S. Cl. ............ 353/31; 353/20; 353/34; 353/37; 353/84; 353/85; 353/97; 353/98; 353/99; 353/102; 362/231; 362/293
(58) Field of Classification Search .............. 353/97, 353/20, 31, 84, 98, 99, 102, 34, 37; 362/231, 362/293, 555, 583, 284, 324; 359/503, 640, 359/126; 349/5, 7, 8, 9; 348/742, 743, 744, 348/745
    See application file for complete search history.

(56) References Cited

U.S. PATENT DOCUMENTS

| | | | |
|---|---|---|---|
| 5,602,679 A * | 2/1997 | Dolgoff et al. ............ | 359/640 |
| 6,273,589 B1 * | 8/2001 | Weber et al. ............. | 362/293 |
| 6,547,400 B1 | 4/2003 | Yokoyama | |
| 6,707,516 B1 * | 3/2004 | Johnson et al. ........... | 349/78 |
| 6,747,710 B2 * | 6/2004 | Hall et al. ............... | 349/9 |
| 6,798,469 B2 | 9/2004 | Kimura | |
| 7,048,385 B2 * | 5/2006 | Beeson et al. ............ | 353/97 |
| 7,234,820 B2 * | 6/2007 | Harbers et al. ........... | 353/94 |
| 7,306,340 B2 * | 12/2007 | Nakagawa et al. ......... | 353/85 |
| 7,547,114 B2 * | 6/2009 | Li et al. ................. | 362/231 |
| 7,604,356 B2 * | 10/2009 | Kubo .................... | 353/84 |

(Continued)

FOREIGN PATENT DOCUMENTS

| CA | 2 705 863 A1 | 6/2009 |
|---|---|---|
| JP | 2000-112031 A | 4/2000 |

(Continued)

OTHER PUBLICATIONS

Extended European Search Report dated Oct. 4, 2010 (in English) in counterpart European Application No. 10167610.4.

(Continued)

*Primary Examiner* — Georgia Y Epps
*Assistant Examiner* — Sultan Chowdhury
(74) *Attorney, Agent, or Firm* — Holtz, Holtz, Goodman & Chick, P.C.

(57) ABSTRACT

A light source device includes: a first light source configured to emit a first source light in a first wavelength range; a source light generator configured to generate, from the first light, a color-varying source light having time varying color; a second light source configured to emit a second source light in a second wavelength range that is different from the first wavelength range; and a light source controller configured to control driving timing for turning on and off each of the first light source and the second light source so as to cyclically select one of the color-varying source light and the second source light to be output as an output source light.

15 Claims, 16 Drawing Sheets

U.S. PATENT DOCUMENTS

| | | |
|---|---|---|
| 7,651,243 B2 | 1/2010 | McGuire, Jr. et al. |
| 2005/0046810 A1* | 3/2005 | Nakamura .................... 353/102 |
| 2007/0091599 A1* | 4/2007 | Hsieh et al. .................... 362/231 |
| 2007/0206390 A1* | 9/2007 | Brukilacchio et al. ........ 362/555 |
| 2007/0230179 A1 | 10/2007 | Ripoll et al. |
| 2009/0009730 A1* | 1/2009 | Destain ........................... 353/84 |
| 2009/0034284 A1 | 2/2009 | Li et al. |
| 2010/0309439 A1 | 12/2010 | Bi et al. |

FOREIGN PATENT DOCUMENTS

| | | |
|---|---|---|
| JP | 2001-356701 A | 12/2001 |
| JP | 2004-341105 A | 12/2004 |
| JP | 2008-261998 A | 10/2008 |
| WO | 2006/133214 A2 | 12/2006 |
| WO | 2009/069010 A1 | 6/2009 |

OTHER PUBLICATIONS

Korean Office Action dated Feb. 27, 2012 (and English translation thereof) in counterpart Korean Application No. 10-2010-0062574.

Japanese Office Action dated Jan. 4, 2011 (and English translation thereof) in counterpart Japanese Application No. 2010-139631.

* cited by examiner

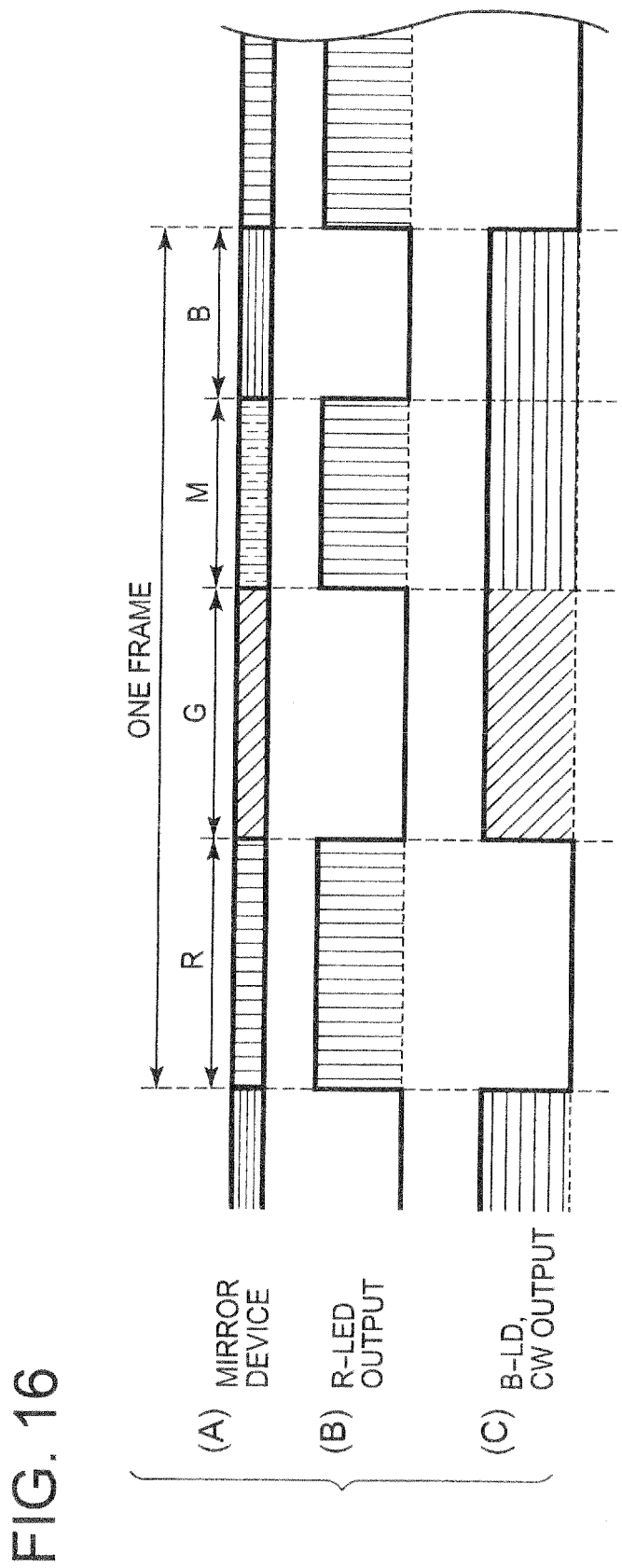

LIGHT SOURCE DEVICE, VIDEO PROJECTOR AND VIDEO PROJECTION METHOD

CROSS-REFERENCE TO THE RELATED APPLICATION(S)

The present application is based upon and claims priority from prior Japanese Patent Application No. 2009-156091, filed on Jun. 30, 2009, the entire content of which are incorporated herein by reference.

BACKGROUND

1. Field of the Invention

The present invention relates to a light source device, a video projector and a video projection method, which are adaptable for a digital light processing (DLP (registered trade mark)) type data projector (video projector).

2. Description of the Related Art

Displaying a color image with a projection type display apparatus requires planar light sources which emit respective primary R, G and B light, and corresponding spatial light modulators, which may result in an increased number of parts and difficulty in achieving smallness, lightness and inexpensiveness of the entire apparatus. For the purpose of solving such a problem, a system has been proposed, in which a light emitting diode emitting ultraviolet light is used for the light source, and a visible light reflection film having characteristics that the ultraviolet light is transmitted and visible light is reflected is formed on the surface of a color wheel On which the ultraviolet light from the light, emitting diode is irradiated, on the light source side, and fluorescent layers respectively emitting visible light corresponding to R, G and B by the irradiation of the ultraviolet light are formed on the back surface of the color wheel. An example of such system is disclosed in JP-A-2004-341105.

However, if the above-described system is employed in practice, various red fluorescent materials, which are currently known in the art, are lacking in red luminance since their emission efficiency is remarkably lower than that of other green and blue fluorescent materials.

As a result, when a bright projection image is to be obtained by preferring luminance, there arises a problem of white balance collapse and hence low color reproducibility. On the other hand, when the white balance and hence the color reproducibility are emphasized, the entire luminance is lowered to meet a red image having a low luminance, which results in a dark image.

SUMMARY

One of objects of the present invention is to provide a light source device, a video projector and a projection method, which are capable of compensating for any possible uneven luminance for each primary color component obtained from a single light source and making color reproducibility compatible with the brightness of a projection image.

According to a first aspect of the present invention, there is provided a light source device including: a first light source configured to emit a first source light in a first wavelength range; a source light modulator comprising a first face and a second face, the source light modulator further comprising a first area configured to diffuse and pass through the first source light to output a transmitted light from the first face, and a second area configured to reflect a reflected light excited by being irradiated by the first source light to output the reflected light from the second face; and a second light source configured to emit a second source light in a second wavelength range that is different from the first wavelength range.

According to a second aspect of the present invention, there is provided a light source device including: a first light source configured to emit a first source light in a first wavelength range; a source light generator configured to generate, from the first light, a color-varying source light having time varying color; a second light source configured to emit a second source light in a second wavelength range that is different from the first wavelength range; and a light source controller configured to control driving timing for turning on and off each of the first light source and the second light source so as to cyclically select one of the color-varying source light and the second source light to be output as an output source light.

According to a third aspect of the present invention, there is provided a video projection method for a video projector. The video projector includes: a light source device including: a first light source configured to emit a first source light in a first wavelength range; a source light generator configured to generate, from the first light, a color-varying source light having time varying color; and a second light source configured to emit a second source light in a second wavelength range that is different from the first wavelength range; a video interface configured to receive a video signal; and a projector unit configured to generate, from output source light output from the light source device, a color photo image in accordance with the video signal and project the color photo image. The method includes: controlling driving timing for turning on and off each of the first light source and the second light source so as to cyclically select one of the color-varying source light and the second source light to be output as the output source light.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 16 shows an example of timing charts showing contents of driving processing of the optical system during one image frame in the eighth modification according to the embodiment.

DETAILED DESCRIPTION

Figure 1:
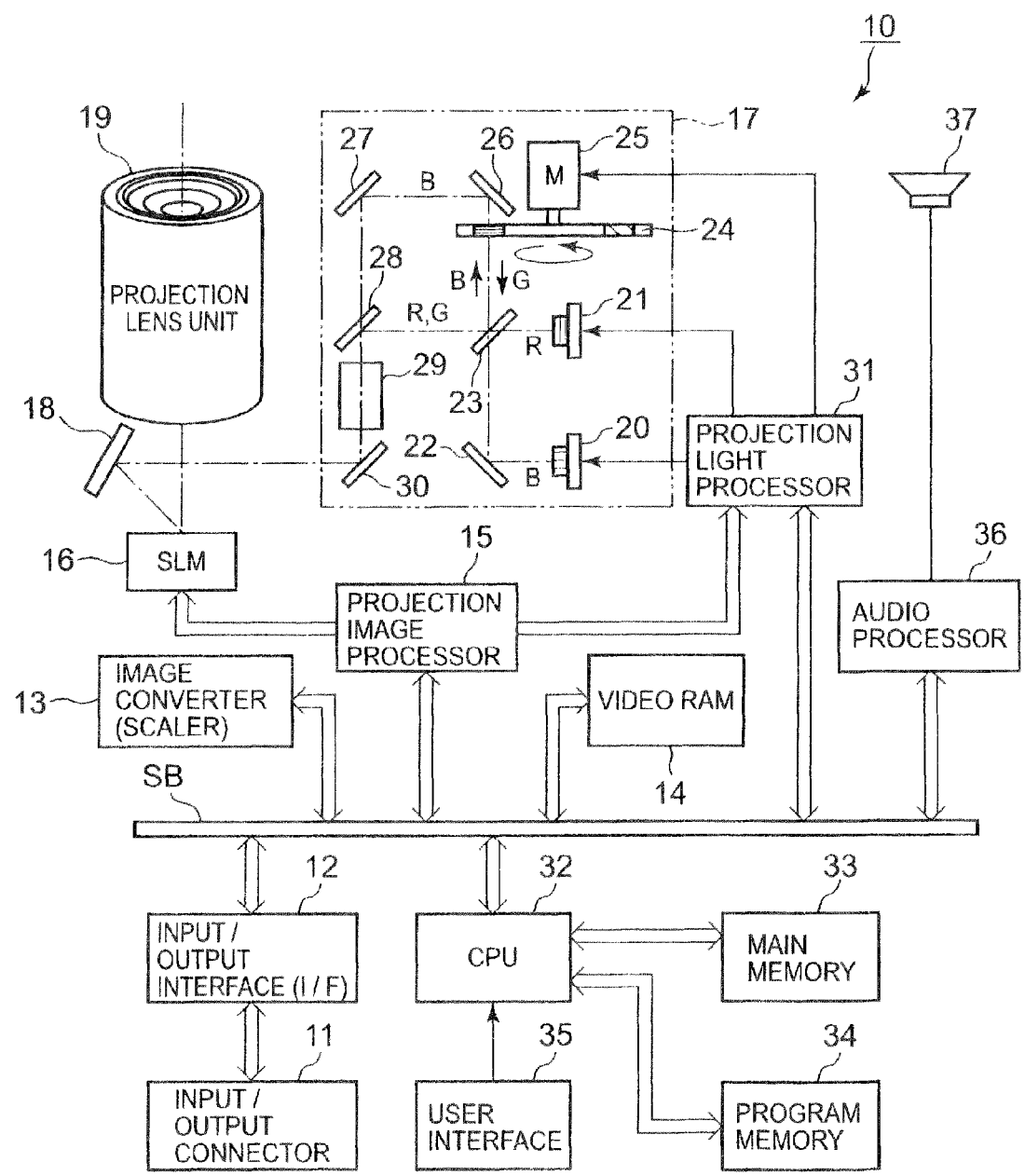
FIG. 1 is a block diagram showing a functional circuit configuration of a data projector apparatus according to an embodiment of the present invention.

An embodiment according to the present invention will be described in detail with reference to the accompanying drawings. The scope of the claimed invention should not be limited to the examples illustrated in the drawings and those described below.

Hereinafter, an example of a DLP (registered trade mark) type data projector, in which the present invention is employed, will be described with reference to the drawings.

FIG. 1 is a block diagram snowing a general functional configuration of an electronic circuit included in a data projector apparatus (video projector) 10 according to the embodiment.

Reference numeral 11 denotes an input/output connector including, for example, a pin jack (RCA) type video input terminal, a D-sub15 type RGB input terminal and a universal serial bus (USB) connector.

A video signal of various standards input from the input/output connector 11 is input to an image converter 13, which is commonly called a "scaler," via an input/output interface (I/F) 12 and a system bus SB.

The image converter 13 converts the input video signal into a video signal of a predetermined format which is adaptable for projection, stores the converted video signal in a video RAM 14 which is a buffer memory for appropriate display, and then sends the converted video signal to a projection image processor 15.

At this time, if necessary, data such as symbols and the like, which represent various operation conditions for OSD (On Screen Display), are processed to overlap with the video signal stored in the video RAM 14, and a resultant video signal is sent to the projection image processor 15.

Upon receiving the video signal, the projection image processor 15 drives a micro mirror device 16 for display, which is a spatial light modulator (SLM), by means of faster time division driving which may be achieved by multiplying a frame rate according to a predetermined form at, for example, 120 [frames/second], by the number of division of color components and the number of display gray scales.

The micro mirror device 16 forms a photo image by means of reflection light which is generated by individually operating tilt angles of a plurality (for example, XGA class (1024 pixels in length×768 pixels in breadth)) of micro mirrors, which are arranged in the form of an array, in an on/off manner at high speed.

In the meantime, primary R, G and B light is cyclically emitted from a light source unit 17 in a time division manner. The primary color light from the light source unit 17 is reflected by a mirror 18 and is then irradiated onto the micro mirror device 16.

Then, a photo image is formed by reflection light in the micro mirror device 16 and the formed photo image is projected onto and displayed on a projection-targeted screen (not shown) through a projection lens unit 19.

The light source unit 17 includes two kinds of light sources, that is, a laser diode 20 which emits blue laser light and an LED 21 which emits red light, detailed optical configuration of which will be described later.

The blue laser light emitted from the laser diode 20 is transmitted through a dichroic mirror 23 after being reflected by a mirror 22, and is then irradiated onto one point on the circumference of a color wheel 24. The color wheel 24 is rotated by a motor 25. A combination of a green fluorescent reflector and a blue transmissive diffuser is formed into a ring shape on the circumference of the color wheel 24 irradiated with the laser light.

In the embodiment, the color wheel 24 serves as a source light modulator that includes a first face and a second face, the source light modulator further including a first area configured to diffuse and pass through the first source light to output a transmitted light from the first face, and a second area configured to reflect a reflected light excited by being irradiated by the first source light to output the reflected light from the second face.

The color wheel 24 also serves as a source light generator that is configured to generate, from the first light, a color-varying source light having time varying color.

When the green fluorescent reflector of the color wheel 24 is placed at a position to be irradiated with the laser light, the reflector is excited to emit green light by the irradiation of the laser light, the excited green light is reflected by the color wheel 24 and then the dichroic mirror 23. Thereafter, the green light is additionally reflected by a dichroic mirror 28, and then, after being turned into a light flux having a substantially uniform luminescence distribution by an integrator 29, is reflected by a mirror 30 toward the mirror 18.

When the blue transmissive diffuser of the color wheel 24 is placed at a position to be irradiated with the laser light, the laser light is diffused by the blue transmissive diffuser to be transmitted through the color wheel 24 and is then reflected by mirrors 26 and 27. Thereafter, the blue light is transmitted through the dichroic mirror 28, and then, after being turned into a light flux having a substantially uniform luminescence distribution by the integrator 29, is reflected by the mirror 30 toward the mirror 18.

The red light emitted from the LED 21 is reflected by the dichroic mirror 28 after being transmitted through the dichroic mirror 23, and then, after being turned into a light flux having a substantially uniform luminescence distribution by the integrator 29, is reflected by the mirror 30 toward the mirror 18.

As described above, the dichroic mirror 23 has the spectroscopic characteristic of reflecting the green light while transmitting the blue light and the red light.

The dichroic mirror 28 has the spectroscopic characteristic of reflecting the red light and the green light while transmitting the blue light.

The integrator 29 receives a light input from a light incidence face and uniformalizes luminescence distribution of the received light. The integrator 29 outputs the light from light output face opposing the light incidence face as a light flux having substantially uniform luminescence distribution.

A projection light processor 31 collectively controls emission timings of the laser diode 20 and the LED 21 of the light source unit 17 and rotation of the color wheel 24 by the motor 25. The projection light processor 31 controls the emission timings of the laser diode 20 and the LED 21 and the rotation of the color wheel 24 in response to a timing of image data provided by the projection image processor 15.

A CPU 32 controls all operation of the above-mentioned circuits. The CPU 32 performs a control operation within the data projector apparatus 10 in association with a main memory such as a DRAM and a program memory 34 such as an electrically-rewritable nonvolatile memory which stores operation programs, various structuralized data and so on.

The CPU 32 performs various projection operations in response to key operation signals from a user interface 35.

The user interface 35 includes a key operation section provided in a body of the data projector apparatus 10, and a laser receiving section which receives infrared light from a remote controller (not shown) for exclusive use with the data projector apparatus 10, and directly outputs a key operation signal, which is based on a key operated by a user through the key operation section of the body the remote controller, to the CPU 32.

It is assumed that, together with both the key operation section and the remote controller, the user interface 35 includes, for example, a focus adjustment key, a zoom adjustment key, an input switching key, a menu key, cursor (left, right, up, down) keys, a set key, a cancel key and the like.

The CPU 32 is also connected to an audio processor 36 via the system bus SB. The audio processor 36 includes a sound source circuit such as a PCM sound source or the like, converts audio data, which are given in projection operation, to analog form, and drives a speaker unit 37 to output sound in accordance with the input analog audio data or to generate a beep sound.

Figure 2:
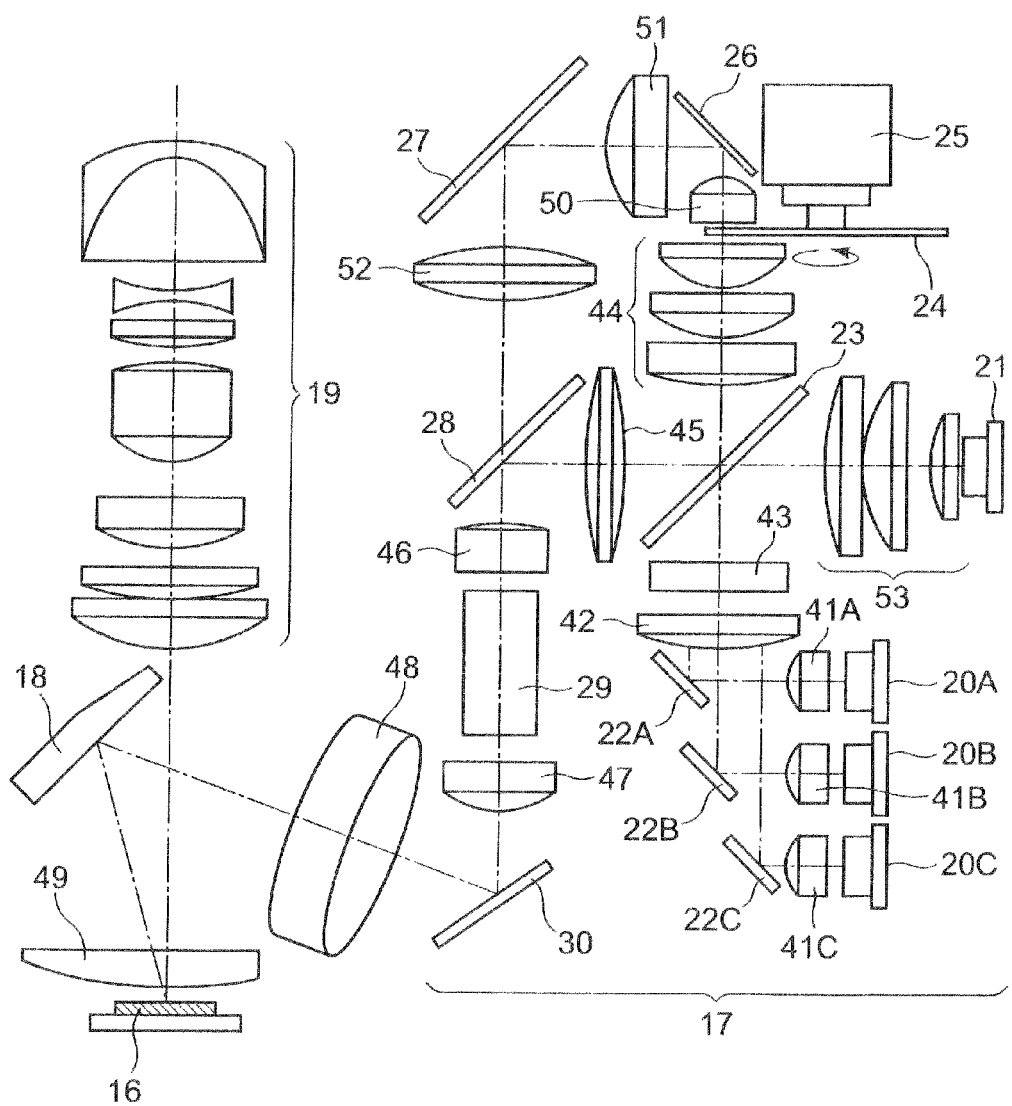
FIG. 2 is a view showing a detailed optical configuration of a part of an optical system according to the embodiment.

Next, FIG. 2 shows an exemplary configuration of a main part of a detailed optical system of the light source unit 17. The same figure represents a planar layout of a configuration of the light source unit 17 and peripheral components.

It is here assumed that a plurality (for example, 3) of laser diodes 20A to 20C having the same emission characteristic is provided and all of these laser diodes 20A to 20C emit blue laser light with, for example, a wavelength of 450 [nm].

The blue light emitted from the laser diodes 20A to 20C is parallelized through lenses 41A to 41C and reflected by mirrors 22A to 22C, respectively, and then, after passing through lenses 42 and 43 and then being transmitted through the dichroic lens 23, is irradiated onto the color wheel 24 through a lens group 44.

In the embodiment, the lenses 42 and 43 and the lens group 44 serve as a light collecting optical system that collects the parallelized blue light on the color wheel 24 that is positioned on the optical axis.

Figure 3:
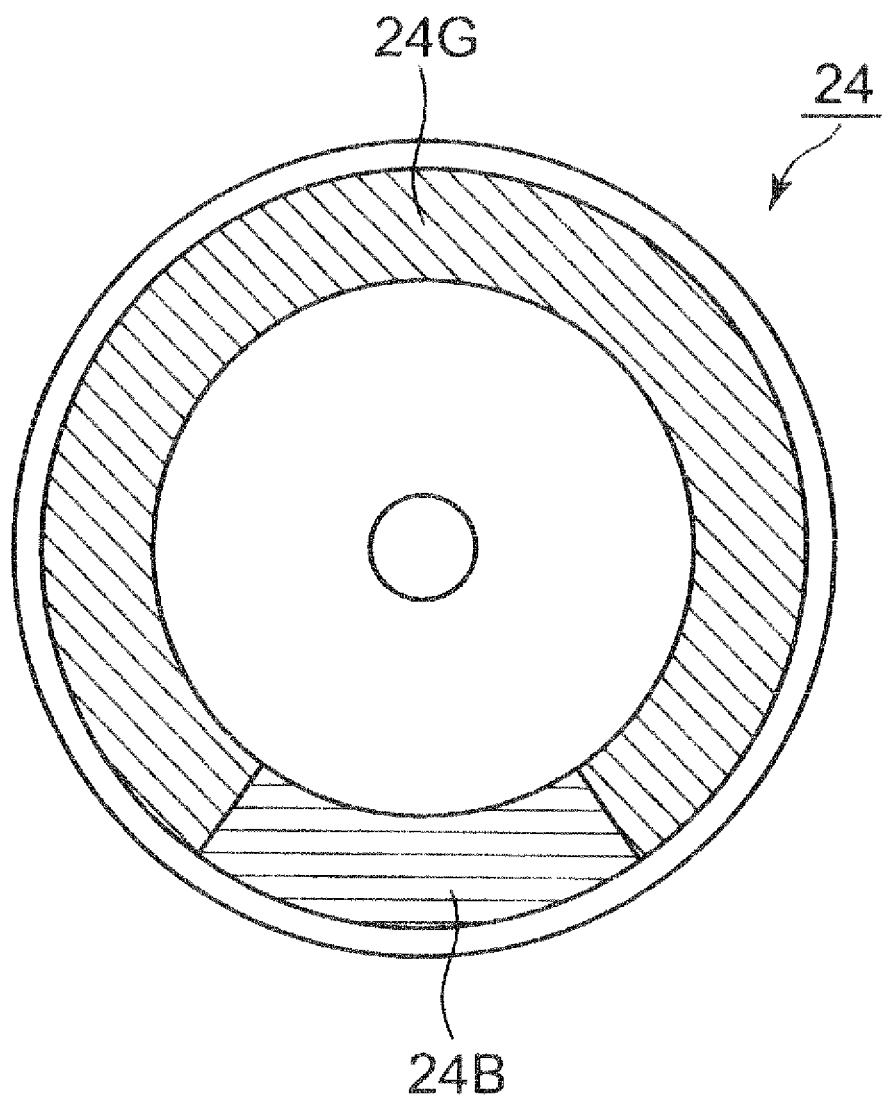
FIG. 3 is a plan view showing a configuration of a color wheel according to the embodiment.

FIG. 3 shows a configuration of the color wheel 24 according to the embodiment. As shown in the same figure, on the color wheel 24, one ring is formed with a combination of, for example, a green fluorescent reflector 24G of an arc form having a center angle of 290 degrees and a blue transmissive diffuser 24B of an arc form having a center angle of 70 degrees.

When the green fluorescent reflector 24G of the color wheel 24 is placed at a position to be irradiated with the blue light, the reflector is excited to emit green light as substantially perfect diffusion light having a wavelength range with a center wavelength of, for example, about 530 [nm], by the irradiation, and the excited green light is reflected by the color wheel 24 and then the dichroic mirror 23 through the lens group 44.

The green light reflected by the dichroic mirror 23 is again reflected by the dichroic mirror 28 via a lens 45, and then, guided to the integrator 29 through a lens 46. In the embodiment, the lens group 44, the lenses 45 and 46 are designed to serve as a light guiding optical system that guides the green light excited by the color wheel 24 to the integrator 29 to fit in the aperture size of the integrator 29. The magnification of the light guiding optical system is designed to be a ratio of the aperture size of the integrator 29 to the irradiation size of the light irradiated on the color wheel 24.

After being turned into a light flux having a substantially uniform luminescence distribution by the integrator 29 through the lens 46, the green light is reflected by the mirror 30 through a lens 47 and then sent to the mirror 18 through a lens 48.

The green light reflected by the mirror 18 is irradiated onto the micro mirror device 16 through a lens 49. Then, a photo image having a green component is formed by reflection light of the green light and is projected toward the outside through the lens 49 and the projection lens unit 19.

When the blue transmissive diffuser 24B of the color wheel 24 is placed at a position to be irradiated with the blue light, the blue light is diffused by the blue transmissive diffuser 24B with a diffusion characteristic that is lower than that of the green light, which is excited as substantially perfect diffusion light, and passes through the blue transmissive diffuser 24B of the color wheel 24. The blue light that is diffused and passed through the color wheel 24 is then reflected by the mirror 26 after being collected by a lens 50 at the rear side of the color wheel 24.

The motor 25 that rotates the color wheel 24 is disposed at the same side as the lens 50 that collects the blue light transmitted through the color wheel 24. The lens 50 may be configured to be small in size with respect to the lens group 44 that collects the green light reflected by the color wheel 24, since the blue light that passed through the color wheel 24 has a low diffusivity compared to that of the green light that is reflected by the color wheel 24.

Then, the blue light is reflected by the mirror 27 through a lens 51, transmitted through the dichroic mirror 28 after passing through a lens 52, and then, guided to the integrator 29 through the lens 46. In the embodiment, the lenses 50, 51, 52 and the lens 46 are designed to serve as a light guiding optical system that guides the blue light that passed through the color wheel 24 to the integrator 29 to fit in the aperture size of the integrator 29. The magnification of the light guiding optical system is designed to be a ratio of the aperture size of the integrator 29 to the irradiation size of the light irradiated on the color wheel 24.

After being turned into a light flux having a substantially uniform luminescence distribution by the integrator 29 through the lens 46, the blue light is reflected by the mirror 30 through the lens 47 and then sent to the mirror 18 through the lens 48.

The LED 21 generates red light having a wavelength of, for example, 620 [nm]. The red light generated by the LED 21 is transmitted through a lens group 53 and then the dichroic mirror 23, is reflected by the dichroic mirror 28 through the lens 45, and then, guided to the integrator 29 through the lens 46. In the embodiment, the lens group 53 and the lenses 45 and 46 are designed to serve as a light guiding optical system that guides the red light that emitted in a light emitting size of the LED 21 to the integrator 29 to fit in the aperture size of the integrator 29. The magnification of the light guiding optical system is designed to be a ratio of the aperture size of the integrator 29 to the light emitting size of the LED 21.

After being turned into alight flux having a substantially uniform luminescence distribution by the integrator 29 through the lens 46, the red Light is reflected by the mirror 30 through the lens 47 and then sent to the mirror 18 through the lens 48.

In the embodiment, the lens 46 serves as a collector lens configured to collect the red light (the second source light), the blue light (the transmitted light), and the green light (the reflected light) to the light incidence face of the integrator 29.

The LED 21 is disposed at a position near the laser diodes 20A-20C, while the optical axis of which being aligned to be in parallel with that of the laser diodes 20A-20C. According to this configuration, a heatsink for cooling the LED 21 and a heatsink for cooling the laser diodes 20A-20C may be easily integrated and shared, whereby the cooling system can be designed to be more compact to reduce the size of the whole apparatus, while reducing the number of components of the cooling system to reduce the overall cost of the whole apparatus. Next, an operation of the above embodiment will be described.

It is here assumed that a time ratio between time slots during which primary R, G and B images constituting one frame of a color image are projected (hereinafter referred to as "R field, G field and B field") is 14:15:7.

In other words, with respect to one rotation of 360 degrees of the color wheel 24 which is being rotated at a constant speed, a time ratio r:g:b between the R field, G field and B field becomes 140 degrees:150 degrees:70 degrees in terms of a center angle of the color wheel 24.

Figure 4:
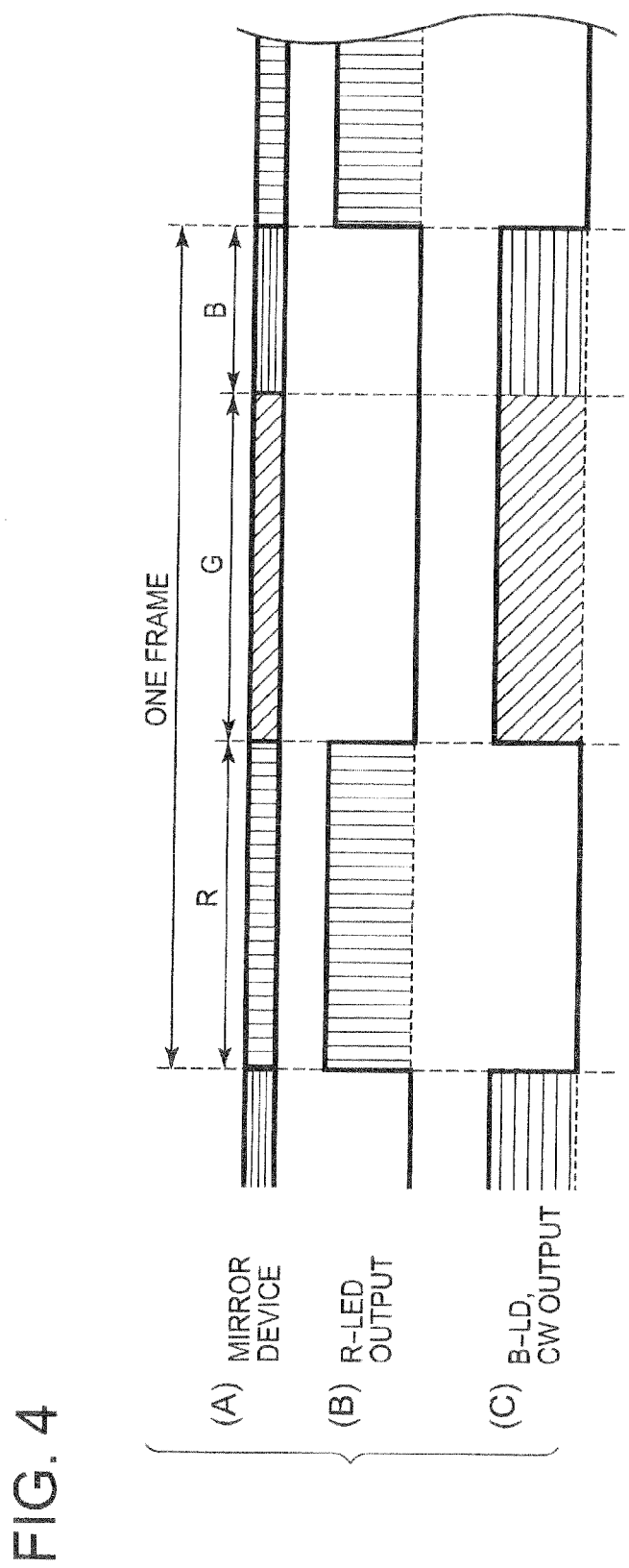
FIG. 4 shows an example of timing charts showing contents of driving processing of the optical system during one image frame according to the embodiment.

Section (A) of FIG. 4 shows a color of source light irradiated onto the micro mirror device 16. As shown in the figure, a control is performed such that each photo image of the R field, G field and B field is formed one by one during a period of time corresponding to one frame.

Section (B) of FIG. 4 shows a turning-on timing of the LED 21 and section (C) of FIG. 4 shows an output timing of source light which is generated through the color wheel (CW) 24 by means of oscillation of the laser diodes (B-LD) 20A to 20C.

As shown in FIG. 3, the color wheel 24 is configured to halve its circumference with the green fluorescent reflector 24G and the blue transmissive diffuser 24B. At the beginning of one frame period of time, in the color wheel 24, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 140 degrees in terms of the center angle of the color wheel 24, the red light is generated by the turning-on of the LED 21, as shown in section (B) of FIG. 4, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 24 is located at a position on their optical axis while the laser diodes 20A to 20C are oscillating, since the oscillation of the laser diodes 20A to 20C is temporarily stopped, the green light as source light is not generated.

Thereafter, the oscillation of the laser diodes 20A to 20C is initiated in synchronization with turning-off of the LED 21, and then, during a period of time of the G field corresponding to 150 degrees in terms of the center angle of the color wheel 24, the green reflection light excited by the green fluorescent reflector 24G is irradiated, as source light, onto the micro mirror device 16.

At this time, as an image corresponding to a green color is displayed by the micro mirror device 16, a green photo image is formed by its reflection light and is projected toward an external projection object through the projection lens unit 19.

When the color wheel 24 is rotated and, instead of the green fluorescent reflector 24G, the blue transmissive diffuser 24B is located on the optical axis extending from the laser diodes 20A to 20C, the blue transmission light diffused by the blue transmissive diffuser 24B is irradiated, as source light, onto the micro mirror device 16 during a later period of time of the B field corresponding to 70 degrees in terms of the center angle of the color wheel 24.

At this time, as an image corresponding to a blue color is displayed by the micro mirror device 16, a blue photo image is formed by its reflection light and is projected toward an external projection object through the projection lens unit 19.

Thereafter, the B field and the one frame period of time are ended, the green fluorescent reflector 24G, instead of the blue transmissive diffuser 24B, is again located on the optical axis extending from the laser diodes 20A to 20C, the oscillation of the laser diodes 20A to 20C is temporarily stopped, and the LED 21 is again turned on to provide a period of time of the R field of the next frame.

In this manner, by controlling the turning-on timing of the LED 21 and the oscillation timing of the laser diodes 20A to 20C in synchronization with the rotation of the color wheel 24 on which the green fluorescent reflector 24G and the blue transmissive diffuser 24B are formed, the red light by the turning-on of the LED 21 and the green and blue light, by the oscillation of the laser diodes 20A to 20C are cyclically generated in a time division manner and are irradiated onto the micro mirror device 16.

As described in detail above, according to the embodiment, in consideration of the fact that emission luminance of a red fluorescent material which emits light by excitation of laser light is lower than those of other colors, in a case where luminance of each of primary color components obtained by the laser diodes 20A to 20C which oscillates blue light as a single light source is uneven, it is possible to take a balance for each primary color and make color reproducibility compatible with the brightness of a projection image by compensating for the unevenness of the luminance using the LED 21 which emits the red light as a different light source.

First Modification

Next, a first modification according to the embodiment will be described.

In this modification, it is assumed that the data projector apparatus 10, particularly, the light source unit 17, has the same basic configuration as those shown in FIGS. 1 and 2, and explanation thereof will be omitted.

It is here assumed that a time ratio between time slots during which primary R, Y (yellow), G and B images constituting one frame of a color image to be projected (hereinafter referred to as "R field, Y field, G field and B field") is 10.5:10.5:8:7.

In other words, with respect to one rotation of 360 degrees of the color wheel 24 which is being rotated at a constant speed, a time ratio r:y:g:b between R field, Y field, G field and B field becomes 105 degrees:105 degrees:80 degrees:70 degrees in terms of a center angle of the color wheel 24.

Figure 5:
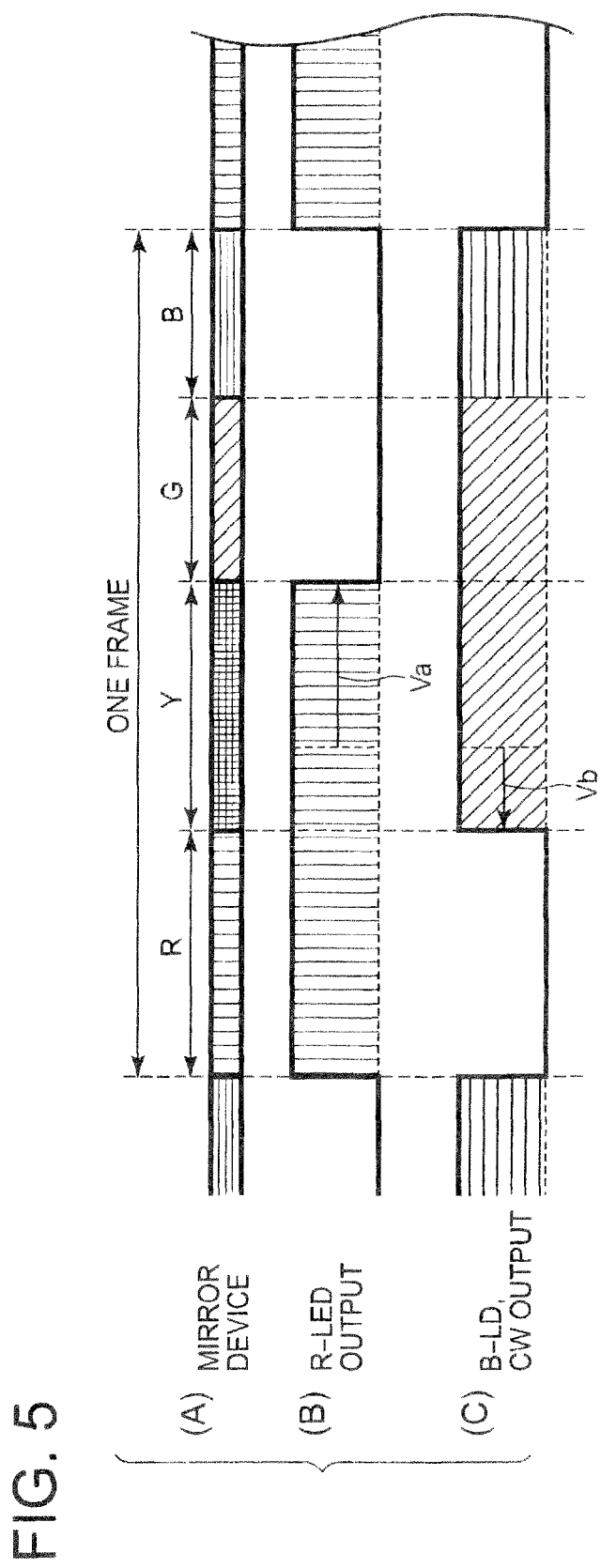
FIG. 5 shows an example of timing charts showing contents of driving processing of the optical system during one image frame in a first modification according to the embodiment.

Section (A) of FIG. 5 shows a color of source light irradiated onto the micro mirror device 16. As shown in the figure, a control is performed such that each photo image of the R field, Y field, G field and B field is formed one by one during a period of time corresponding to one frame.

Section (B) of FIG. 5 shows a turning-on timing of the LED 21 and section (C) of FIG. 5 shows an output timing of source light which is generated through the color wheel (CW) 24 by means of oscillation of the laser diodes (B-LD) 20A to 20C.

As shown in FIG. 3, the color wheel 24 is configured to halve its circumference with the green fluorescent reflector 24G and the blue transmissive diffuser 24B. At the beginning of one frame period of time, in the color wheel 24, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 105 degrees in terms of the center angle of the color wheel 24, only the red light, is generated by the turning-on of the LED 21, as shown in section (B) of FIG. 5, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 24 is located at a position on their optical axis while the laser diodes 20A to 20C are oscillating, since the oscillation of the laser diodes 20A to 20C is temporarily stopped, the green light as source light is not generated.

Thereafter, with the LED 21 remaining turned on, the oscillation of the laser diodes 20A to 20C is initiated, and then, a period of time of the Y field corresponding to 105 degrees in terms of the center angle of the color wheel 24 is provided.

At this time, the red light by the turning-on of the LED 21 is mixed with the green reflection light excited by the green fluorescent reflector 24G of the color wheel 24 by the oscillation of the laser diodes 20A to 20C after the dichroic mirror 23, and is irradiated, as yellow source light, onto the micro mirror device 16.

At this time, as an image corresponding to a yellow color is displayed by the micro mirror device 16, a green photo image is formed by its reflection light and is projected toward an external projection object through the projection lens unit 19.

In a period of time of the subsequent G field, the LED 21 is turned off, the oscillation of the laser diodes 20A to 20C continues, and then, a period of time of the G field corresponding to 80 degrees in terms of the center angle of the color wheel 24 is provided.

At this time, the green reflection light excited by the green fluorescent reflector 24G of the color wheel 24 by the oscillation of the laser diodes 20A to 20C is irradiated, as source light, onto the micro mirror device 16.

Accordingly, as an image corresponding to a green color is displayed by the micro mirror device 16, a green photo image is formed by its reflection light and is projected toward an external projection object through the projection lens unit 19.

Thereafter, when the color wheel 24 is rotated and, instead of the green fluorescent reflector 24G, the blue transmissive diffuser 24B is located on the optical axis extending from the laser diodes 20A to 20C, a period of time of the B field corresponding to 70 degrees in terms of the center angle of the color wheel 24 is provided and the blue transmission light diffused by the blue transmissive diffuser 24B is irradiated, as source light, onto the micro mirror device 16 during this period of time of the B field.

At this time, as an image corresponding to a blue color is displayed by the micro mirror device 16, a blue photo image is formed by its reflection light and is projected toward an external projection object through the projection lens unit 19.

Thereafter, the B field and the one frame period of time are ended, the green fluorescent reflector 24G, instead of the blue transmissive diffuser 24B, is again located on the optical axis extending from the laser diodes 20A to 20C, the oscillation of the laser diodes 20A to 20C is temporarily stopped, and the LED 21 is again turned on to provide a period of time of the R field of the next frame.

In this manner, by controlling the turning-on timing of the LED 21 and the oscillation timing of the laser diodes 20A to 20C in synchronization with the rotation of the color wheel 24 on which the green fluorescent reflector 24G and the blue transmissive diffuser 24B are formed, the red light by the turning-on of the LED 21 alone, the yellow light by the mixture of the red light by the turning-on of the LED 21 and the green light by the oscillation of the laser diodes 20A to 20C, and the green and blue light by the oscillation of the laser diodes 20A to 20C alone are cyclically generated in a time division manner and are irradiated onto the micro mirror device 16.

In particular, in order to obtain the yellow light by a mixed color (complementary color) using both the LED 21 and the laser diodes 20A to 20C, the period of time of the turning-on of the LED 21 and the period of time of the oscillation of the laser diodes 20A to 20C were set to extend over those shown in FIG. 4, as indicated by arrows Va and Vb in FIG. 5, respectively. This allows the entire projection image to be brighter.

Second Modification

Next, a second modification according to the embodiment will be described.

In this modification, it is assumed that the data projector apparatus 10, particularly, the light source unit 17, has the same basic configuration as those shown in FIGS. 1 and 2, and explanation thereof will be omitted.

It is here assumed that a time ratio between time slots is during which primary R, W (white), Y (yellow), G and B images constituting one frame of a color image to be projected (hereinafter referred to as "R field, W field, Y field, G field and B field") is 10.5:5.5:5:8:7.

In other words, with respect to one rotation of 360 degrees of the color wheel 24 which is being rotated at a constant speed, a time ratio r:w:y:g:b between R field, W field, Y field, G field and B field becomes 105 degrees:55 degrees:50 degrees:80 degrees:70 degrees in terms of a center angle of the color wheel 24.

Figure 6:
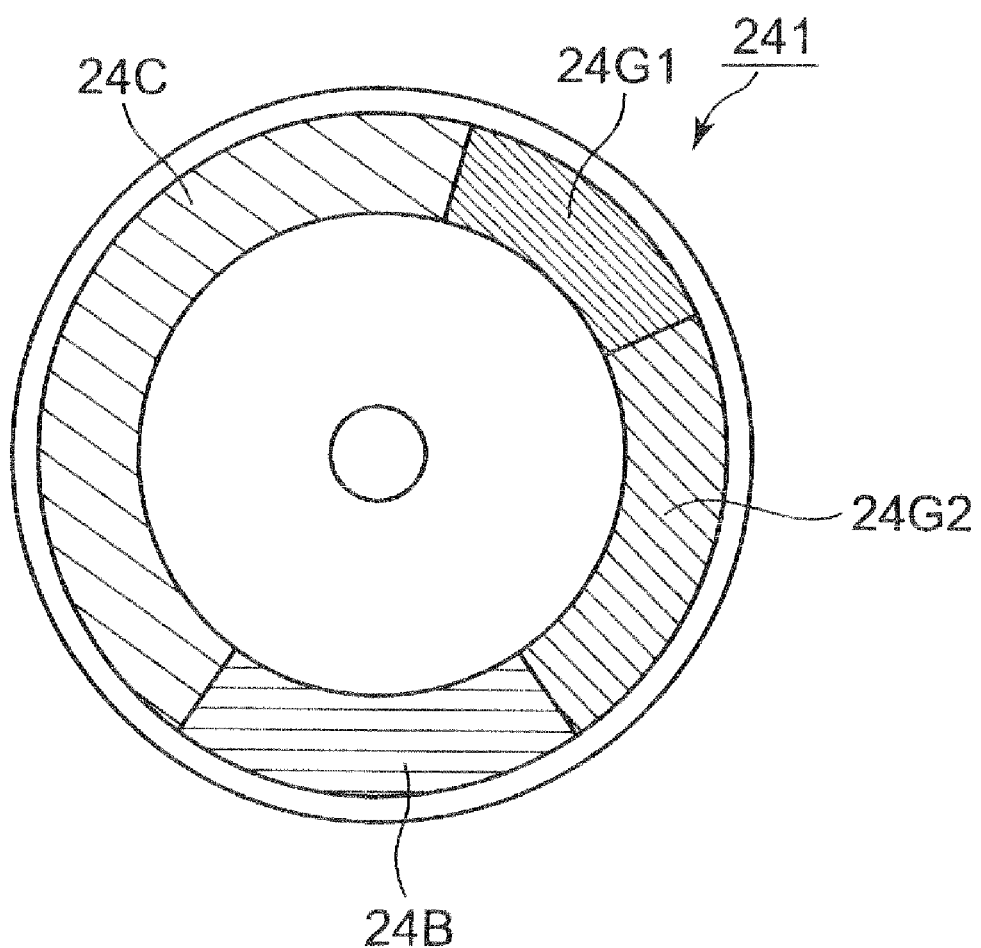
FIG. 6 is a plan view showing a configuration of a color wheel in a second modification according to the embodiment.

FIG. 6 shows a configuration of a color wheel 241 replaced for the color wheel 24. As shown in the figure, on the color wheel 241, one ring is formed with a combination of, for example, a cyan fluorescent reflector 24C of an arc form having a center angle of 160 degrees, d green fluorescent reflector 24G1 of an arc form having a center angle of 50 degrees, a green fluorescent reflector 24G2 of an arc form having a center angle of 80 degrees and a blue transmissive diffuser 24B of an arc form having a center angle of 70 degrees.

If the cyan fluorescent reflector 24C of the color wheel 241 is placed at a position to be irradiated with the blue light emitted from the laser diodes 20A to 20C, the reflector is excited to emit cyan (indigo blue) light having a wavelength range with a center wavelength of, for example, about 480 [nm], by the irradiation, and the excited cyan light is reflected by the color wheel 241 and then the dichroic mirror 23 through the lens group 44.

When the green fluorescent reflector 24G1 of the color wheel 241 is placed at a position to be irradiated with the blue light emitted from the laser diodes 20A to 20C, the reflector is excited to emit green light having a wavelength range with a center wavelength of, for example, about 560 [nm], by the irradiation, and the excited green light is reflected by the color wheel 241 and then the dichroic mirror 23 through the lens group 44.

When the green fluorescent reflector 24G2 of the color wheel 241 is placed at a position to be irradiated with the blue light emitted from the laser diodes 20A to 20C, the reflector is excited to emit green light having a wavelength range with a center wavelength of, for example, about 530 [nm], by the irradiation, and the excited green light is reflected by the color wheel 241 and then the dichroic mirror 23 through the lens group 44.

Figure 7:
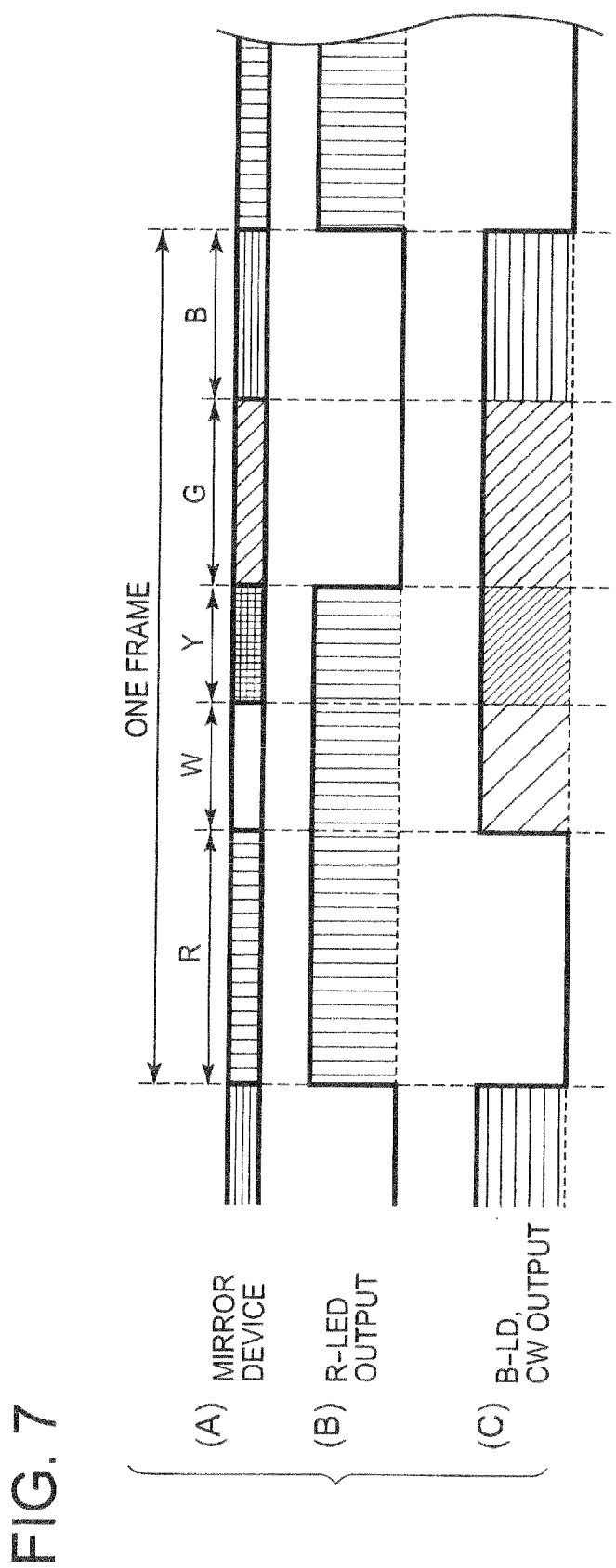
FIG. 7 shows an example of timing charts showing contents of driving processing of the optical system during one image frame in the second modification according to the embodiment.

Section (A) of FIG. 7 shows a color of source light irradiated onto the micro mirror device 16. As shown in the figure, a control is performed such that each photo image of the R field, W field, Y field, G field and B field is formed one by one during a period of time corresponding to one frame.

Section (B) of FIG. 7 shows a turning-on timing of the LED 21 and section (C) of FIG. 7 shows an output timing of source light which is generated through the color wheel (CW) 241 by means of oscillation of the laser diodes (B-LD) 20A to 20C.

As shown in FIG. 6, the color wheel 241 is configured to quarter its circumference with the cyan fluorescent reflector 24C, the green fluorescent reflector 24G1, the green fluorescent reflector 24G2 and the blue transmissive diffuser 24B. At the beginning of one frame period of time, in the color wheel 241, rotation of the motor 25 is controlled by the projection light processor 31 such that a position at which the blue transmissive diffuser 24B is switched to the cyan fluorescent reflector 24C is located on an optical axis extending from the laser diodes 20A to 20C.

At the beginning of one frame, during a period of time of the R field corresponding to 105 degrees in terms of the center angle of the color wheel 241, only the red light is generated by the turning-on of the LED 21, as shown in section (B) of FIG. 7, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the cyan fluorescent reflector 24C of the color wheel 241 is located at a position on their optical axis while the laser diodes 20A to 20C are oscillating, since the oscillation of the laser diodes 20A to 20C is temporarily stopped, the cyan light as source light is not generated.

Thereafter, with the LED 21 remaining turned on, the oscillation of the laser diodes 20A to 200 is initiated, and then, a period of time of the W field corresponding to 55 degrees in terms of the center angle of the color wheel 241 is provided.

At this time, the red light by the turning-on of the LED 21 is mixed with the cyan reflection light excited by the cyan fluorescent reflector 24C of the color wheel 241 by the oscillation of the laser diodes 20A to 20C after the dichroic mirror 23, and is irradiated, as white source light, onto the micro mirror device 16.

At this time, as a luminance image corresponding to a white color is displayed by the micro mirror device 16, a photo image by a monochromic luminance image is formed by its reflection light and is projected toward an external projection object through the projection lens unit 19.

In a period of time of the subsequent Y field, the turning-on of the LED 21 and the oscillation of the laser diodes 20A to 20C continue, and the green fluorescent reflector 24G1 of the color wheel 241 is located on the optical axis of the background color light extending from the laser diodes 20A to 20C.

Hereby, the red light by the turning-on of the LED 21 is mixed with the green reflection light excited by the green fluorescent reflector 24G1 of the color wheel 241 by the oscillation of the laser diodes 20A to 20C after the dichroic mirror 23, and is irradiated, as yellow source light, onto the micro mirror device 16.

At this time, as an image corresponding to a yellow color is displayed by the micro mirror device 16, a yellow photo image is formed by its reflection light and is projected toward an external projection object through the projection lens unit 19.

In a period of time of the subsequent G field, the LED 21 is turned off, the oscillation of the laser diodes 20A to 20C continues, and then, a period of time of the G field corresponding to 80 degrees in terms of the center angle of the color wheel 241 is provided.

At this time, the green reflection light excited by the green fluorescent reflector 24G2 of the color wheel 241 by the oscillation of the laser diodes 20A to 20C is irradiated, as source light, onto the micro mirror device 16.

Accordingly, as an image corresponding to a green c is displayed by the micro mirror device 16, a green photo image is formed by its reflection light and is projected toward an external projection object through the projection lens unit 19.

Thereafter, when the color wheel 241 is further rotated and, instead of the green fluorescent reflector 24G2, the blue transmissive diffuser 24B is located on the optical axis extending from the laser diodes 20A to 20C, a period of time of the B field corresponding to 70 degrees in terms of the center angle of the color wheel 241 is provided and the blue transmission light diffused by the blue transmissive diffuser 24B is irradiated, as source light, onto the micro mirror device 16 during this period of time of the B field.

At this time, as an image corresponding to a blue color is displayed by the micro mirror device 16, a blue photo image is formed by its reflection light and is projected toward an external projection object through the projection lens unit 19.

Thereafter, the B field and the one frame period of time are ended, the cyan fluorescent reflector 24C, instead of the blue transmissive diffuser 24B, is again located on the optical axis extending from the laser diodes 20A to 20C, the oscillation of the laser diodes 20A to 20C is temporarily stopped, and the LED 21 is again turned on to provide a period of time of the R field of the next frame.

In this manner, by controlling the turning-on timing of the LED 21 and the oscillation timing of the laser diodes 20A to 20C in synchronization with the rotation of the color wheel 241 on which the cyan fluorescent reflector 24C, the green fluorescent reflectors 24G1 and 24G2 and the blue transmissive diffuser 24B are formed, the red light by the turning-on of the LED 21 alone, the white light by the mixture of the red light by the turning-on of the LED 21 and the cyan light by the oscillation of the laser diodes 20A to 20C, the yellow light by the mixture of the red light by the turning-on of the LED 21 and the green light by the oscillation of the laser diodes 20A to 20C, and the green and blue light by the oscillation of the laser diodes 20A to 20C alone are cyclically generated in a time division manner and are irradiated onto the micro mirror device 16.

In particular, in order to obtain the white light and the yellow light by a mixed color (complementary color) using both the LED 21 and the laser diodes 20A to 20C, the kind of fluorescent material formed on the color wheel 214 was varied. This makes it possible to obtain source light of a variety of colors without changing an output of a light source side, which may result in higher brightness and excellent color rendering of the entire projection image.

Third Modification

Next, a third modification according to the embodiment will be described.

In this modification, it is assumed that the data projector apparatus 10, particularly, the light source unit 17, has the same basic configuration as those shown in FIGS. 1 and 2, and explanation thereof will be omitted.

Here, boundary time slots (hereinafter referred to as "spoke time slots") are provided for respective time slots during which primary R, G and B images constituting one frame of a color image to be projected are projected (hereinafter referred to as "R field, G field and B field"), with one frame being constituted by 6 R, Y (yellow), G, Y (yellow), B and M (magenta) fields in total, and it is assumed that a time ratio between the R, Y, G, Y, B and M fields is 13:1:14:1:6:1.

In other words, with respect to one rotation of 360 degrees of the color wheel 24 which is being rotated at a constant speed, a time ratio r:y:g:y:b:m between the R field, Y field, G field, Y field, B field and M field becomes 130 degrees:10 degrees:140 degrees:10 degrees:60 degrees:10 degrees in terms of a center angle of the color wheel 24.

Figure 8:
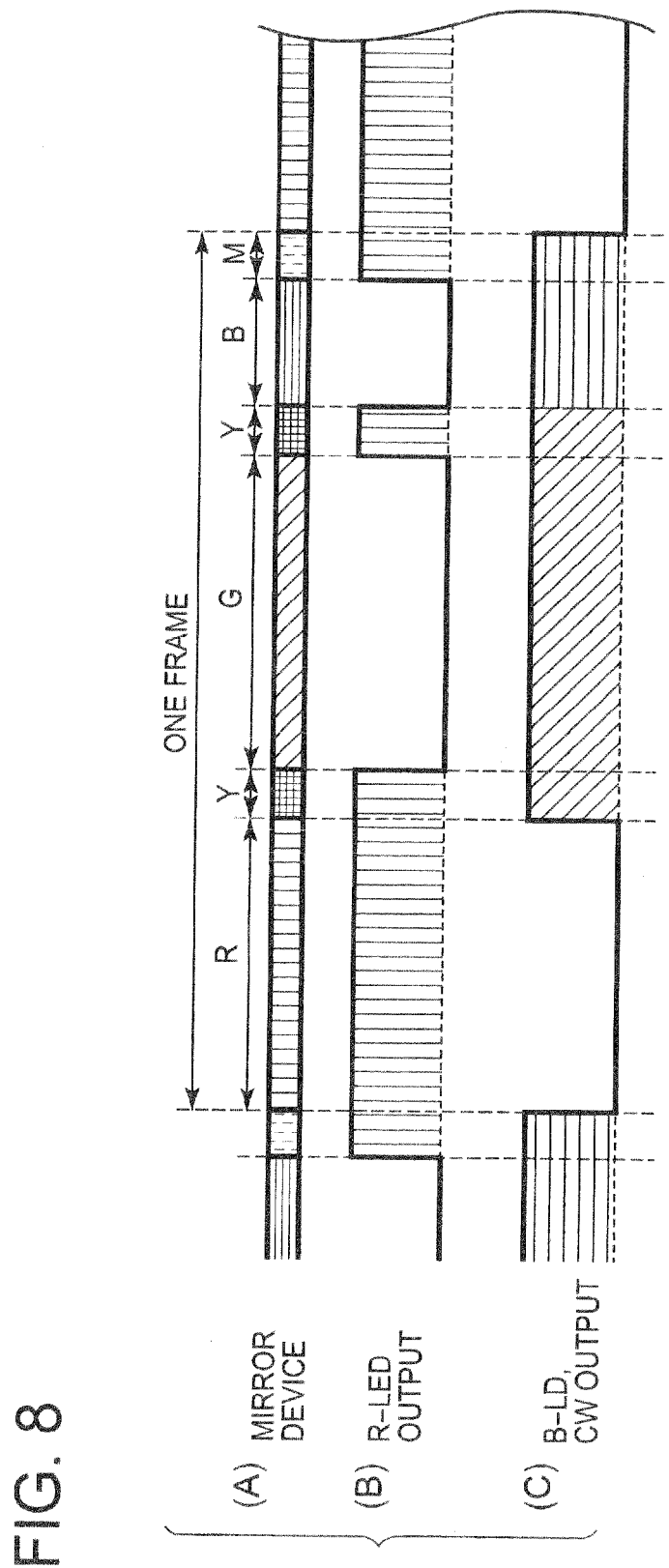
FIG. 8 shows an example of timing charts showing contents of driving processing of the optical system during one image frame in a third modification according to the embodiment.

Section (A) of FIG. 8 shows a color of source light irradiated onto the micro mirror device 16. As shown in the figure, a control is performed such that each photo image of the R field, Y field, G field, Y field, B field and M field is formed one by one during a period of time corresponding to one frame.

Section (B) of FIG. 8 shows a turning-on timing of the LED 21 and section (C) of FIG. 8 shows an output timing of source light which is generated through the color wheel (CW) 24 by means of oscillation of the laser diodes (B-LD) 20A to 20C.

As shown in FIG. 3, the color wheel 24 is configured halve its circumference with the green fluorescent reflector 24G and the blue transmissive diffuser 24B. At the beginning of one frame period of time, in the color wheel 24, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 130 degrees in terms of the center angle of the color wheel 24, the red light is generated by the LED 21 which continues to be turned on from an immediately previous frame, as shown in section (B) of FIG. 8, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 24 is located at a position on their optical axis while the laser diodes 20A to 20C are oscillating, since the oscillation of the laser diodes 20A to 20C is temporarily stopped, the green light as source light is not generated.

Thereafter, with the LED 21 remaining turned on, the oscillation of the laser diodes 20A to 20C is initiated, and then, the green reflection light excited by the green fluorescent reflector 240 is also irradiated, as source light, onto the micro mirror device 16 for a period of time of the Y field corresponding to 10 degrees in terms of the center angle of the color wheel 24.

At this time, after the dichroic mirror 23, the red light by the turning-on of the LED 21 is mixed with the green light excited by the green fluorescent reflector 24G, and yellow light by a complementary color is irradiated onto the micro mirror device 16. As an image corresponding to a yellow color is displayed by the micro mirror device 16, a yellow photo image is formed by its reflection light and is projected toward an external projection object through the projection lens unit 19.

After this short Y field, the LED 21 which generates the red light is turned off, while the generation of the green light by the laser diodes 20A to 20C is maintained. Thereafter, only the green reflection light excited by the green fluorescent reflector 24G is irradiated, as source light, onto the micro mirror device 16 for a period of time of the G field corresponding to 140 degrees in terms of the center angle of the color wheel 24.

As an image corresponding to a green color is displayed by the micro mirror device 16, a green photo image is formed by its reflection light and is projected toward an external projection object through the projection lens unit 19.

After completion of the G field, the turning-on of the red light by the LED 21 is again initiated with the generation of the green light by the laser diodes 20A to 20C and the color wheel 24 maintained.

In the second Y field of this one frame, like the Y field immediately before the G field, the red light by the turning-on of the LED 21 is mixed with the green light and the yellow light by a complementary color is irradiated onto the micro mirror device 16 for a period of time corresponding to 10 degrees in terms of the center angle of the color wheel 24. As an image corresponding to a yellow color is displayed by the micro mirror device 16, a yellow photo image is formed by its reflection light and is projected toward an external projection object through the projection lens unit 19. The LED 21 is turned off at the same time when the second Y field is ended.

In the subsequent B field, the blue transmissive diffuser 24B instead of the green fluorescent reflector 24G is located on the optical axis extending from the laser diodes 20A to 20C by the rotation of the color wheel 24, and thereafter, only the blue transmission light diffused by the blue transmissive diffuser 24B is irradiated, as source light, onto the micro mirror device 16 during a period of time of the B field corresponding to 60 degrees in terms of the center angle of the color wheel 24.

At this time, as an image corresponding to blue color is displayed by the micro mirror device 16, a blue photo image is formed by its reflection light and is projected toward an external projection object through the projection lens unit 19.

Thereafter, the B field is ended, and the turning-on of the red light by the LED 21 is again initiated with the generation of the blue light by the laser diodes 20A to 20C and the color wheel 24 maintained.

In the M field, the red light by the turning-on of the LED 21 is mixed with the blue light and the magenta (murex) light by a complementary color is irradiated onto the micro mirror device 16 during a period of time corresponding to 10 degrees in terms of the center angle of the color wheel 24.

As an image corresponding to a magenta color is displayed by the micro mirror device 16, a magenta photo image is formed by its reflection light and is projected toward an external projection object through the projection lens unit 19. Even after M field is ended, the turning-on of the LED 21 is maintained for the next frame.

In this manner, since a period of time during which a complementary image by the color mixture by the simultaneous turning-on of the LED 21 is projected for the spoke time slots which are the boundary time slots for respective time slots during which primary R, G and B images are originally projected is provided, the entire image can be brighter.

In addition, although it has been illustrated that the yellow image and the magenta image are respectively projected in two Y fields and one M field per one frame of the spoke time slots, brightness of an image per one frame may be further increased by providing a full gray scale in which all pixels of the micro mirror device 16 continue to be turned on during a corresponding field period of time, without necessarily forming a photo image in the spoke time slots after a color balance with different fields is adjusted.

In addition, similarly, in two Y fields and one M field per one frame of the spoke time slots, by forming and projecting photo images in a wider color range corresponding to the light source color, for example, a photo image according to a color range of orange color to yellow color to yellowish green color in the Y fields and a photo image according to a color range of blue color to celadon green color to violet color in the M field, a brighter image may be provided and a color reproducibility may be increased.

In addition, similarly, by forming and projecting a photo image by a binary image without performing a detailed gray scale representation in the spoke time slots, the brightness and contrast of an image per one frame may be further increased.

Fourth Modification

Next, a fourth modification according to the embodiment will be described.

In this modification, it is assumed that the data projector apparatus 10, particularly, the light source unit 17, has the same basic configuration as those shown in FIGS. 1 and 2, and explanation thereof will be omitted.

Here, boundary time slots (hereinafter referred to as "spoke time slots") are provided for respective time slots during which primary R, G and B images constituting one frame of a color image to be projected are projected (hereinafter referred to as "R field, G field and B field"), with one frame being constituted by 6 R, Y (yellow), G, W (white), B, and M (magenta) fields in total, and it is assumed that a time ratio between the R, Y, G, W, B and M fields is 13:1:14:1:6:1.

In other words, with respect to one rotation of 360 degrees of the color wheel 242 which is being rotated at a constant speed, a time ratio r:y:g:w:b:m between the R field, Y field, G field, W field, B field and M field becomes 130 degrees:10 degrees:140 degrees:10 degrees:70 degrees:10 degrees in terms of a center angle of the color wheel 24.

Figure 9:
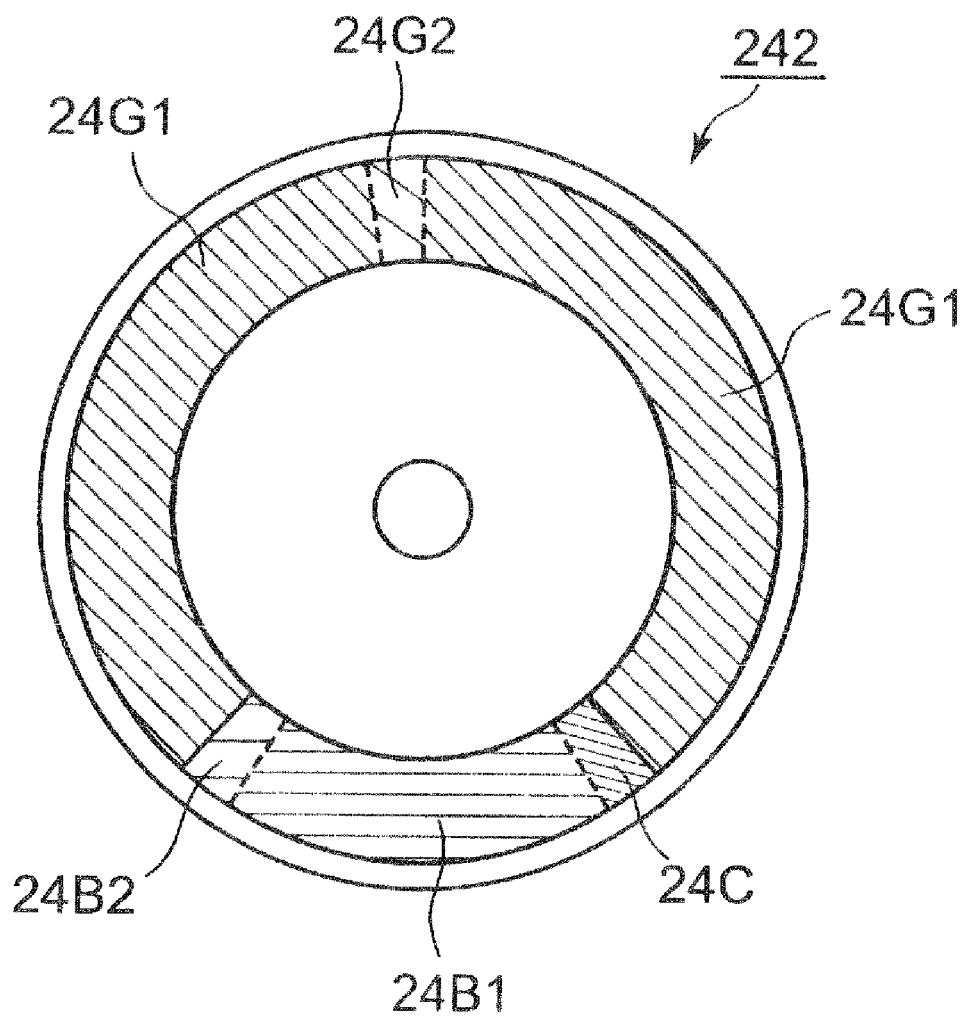
FIG. 9 is a plan view showing a configuration of a color wheel in a fourth modification according to the embodiment.

FIG. 9 shows a configuration of a color wheel 242 replacing the color wheel 24. As shown in the same figure, on the color wheel 242, one ring is formed with a combination of, for example, a green fluorescent reflector 24G1 of an arc form having a center angle of 130 degrees, a green fluorescent reflector 24G2 having a center angle of 10 degrees, a green fluorescent reflector 24G1 of an arc form having a center angle of 140 degrees, a cyan fluorescent reflector 24C having a center angle of 10 degrees, a blue transmissive diffuser 24B1 having a center angle of 60 degrees and a blue fluorescent reflector 24B2 having a center angle of 10 degrees.

When the green fluorescent reflector 24G1 of the color wheel 242 is placed at a position to be irradiated with the blue light emitted from the laser diodes 20A to 20C, the reflector is excited to emit green light having a wavelength range with a center wavelength of, for example, about 530 [nm], by the irradiation, and the excited green light is reflected by the color wheel 242 and then the dichroic mirror 23 through the lens group 44.

When the green fluorescent reflector 24G2 of the color wheel 242, which corresponds to a spoke period of time, is placed at a position to be irradiated with the blue light emitted from the laser diodes 20A to 20C, the reflector is excited to emit green light having a wavelength range with a center wavelength of, for example, about 560 [nm], by the irradiation, and the excited green light is reflected by the color wheel 242 then the dichroic mirror 23 through the lens group 44.

When the cyan fluorescent reflector 24C of the color wheel 242, which equally corresponds to a spoke period of time, is placed at a position to be irradiated with the blue light, emitted from the laser diodes 20A to 20C, the reflector is excited to emit cyan (indigo blue) light having a wavelength range with a center wavelength of, for example, about 480 [nm], by the irradiation, and the excited cyan light is reflected by the color wheel 242 and then the dichroic mirror 23 through the lens group 44.

When the blue transmissive diffuser 24B1 of the color wheel 242 is placed at a position to be irradiated with the blue light emitted from the laser diodes 20A to 20C, blue light having an oscillating wavelength of about 450 [nm] of the laser diodes 20A to 20C is diffused and transmitted by the irradiation, and the transmitted blue light is transmitted through the dichroic mirror 28 through the mirrors 26 and 27.

When the blue fluorescent reflector 24B2 of the color wheel 242, which corresponds to a spoke period of time, is placed at a position to be irradiated with the blue light emitted from the laser diodes 20A to 20C, the reflector is excited to emit blue light having a wavelength range with a center wavelength of, for example, about 490 [nm], by the irradiation, and the excited blue light is reflected by the color wheel 242 and then the dichroic mirror 23 through the lens group 44.

Figure 10:
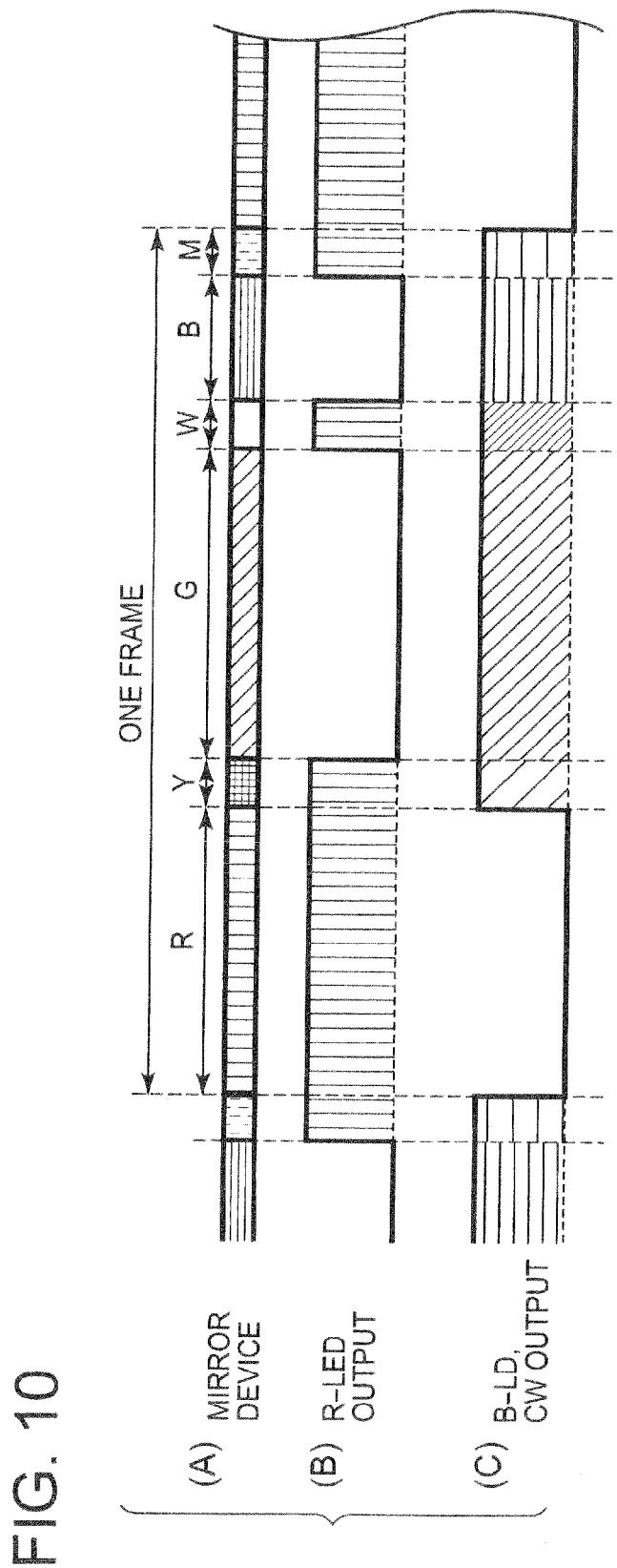
FIG. 10 shows an example of timing charts showing contents of driving processing of the optical system during one image frame in the fourth modification according to the embodiment.

Section (A) of FIG. 10 shows a color of source light irradiated onto the micro mirror device 16. As shown in the figure, a control is performed such that each photo image of the R field, Y field, G field, W field, B field and M field is formed one by one during a period of time corresponding to one frame.

Section (B) of FIG. 10 shows a turning-on timing of the LED 21 and section (C) of FIG. 10 shows an output timing of source light which is generated through the color wheel (CW) 242 by means of oscillation of the laser diodes (B-LD) 20A to 20C.

As shown in FIG. 9, the color wheel 242 is configured to divide its circumference into six parts with the green fluorescent reflector 24G1, the green fluorescent reflector 24G2, the green fluorescent reflector 24G1, the cyan fluorescent reflector 24C, the blue transmissive diffuser 24B1 and the blue fluorescent reflector 24B2. At the beginning of one frame period of time, in the color wheel 242, rotation of the motor 25 is controlled by the projection light processor 31 such that a position at which the blue fluorescent reflector 24B2 is switched to the green fluorescent reflector 24G1 is located on an optical axis extending from the laser diodes 20A to 20C.

At the beginning of one frame, during a period of time of the R field corresponding to 130 degrees in terms of the center angle of the color wheel 242, the red light is generated by the LED 21 which continues to be turned on from an immediately previous frame, as shown in section (B) of FIG. 10, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G1 of the color wheel 242 is located at a position on their optical axis while the laser diodes 20A to 20C are oscillating, since the oscillation of the laser diodes 20A to 20C is temporarily stopped, the green light as source light is not generated.

Thereafter, with the LED 21 remaining turned on, the oscillation of the laser diodes 20A to 20C is initiated, and then, the green reflection light excited by the green fluorescent reflector 24G2 is also irradiated, as source light, onto the micro mirror device 16 for a period of time of the Y field corresponding to 10 degrees in terms of the center angle of the color wheel 242.

At this time, after the dichroic mirror 23, the red light by the turning-on of the LED 21 is mixed with the green light excited by the green fluorescent reflector 24G2, and yellow light by a complementary color is irradiated onto the micro mirror device 16. As an image corresponding to a yellow color is displayed by the micro mirror device 16, a yellow photo image is formed by its reflection light and is projected toward an external projection object through the projection lens unit 19.

After this short Y field, the LED 21 which generates the red light is turned off, the green fluorescent reflector 24G1 is instead located on the optical axis in the color wheel 242 to generate new green light. Thereafter, only the green reflection light excited by the green fluorescent reflector 24G1 is irradiated, as source light, onto the micro mirror device 16 for a period of time of the G field corresponding to 140 degrees in terms of the center angle of the color wheel 242.

As an image corresponding to a green color is displayed by the micro mirror device 16, a green photo image is formed by its reflection light and is projected toward an external projection object through the projection lens unit 19.

After completion of the G field, the cyan light by the cyan fluorescent reflector 24C is generated by the laser diodes 20A to 20C and the color wheel 242, and the turning-on of the red light by the LED 21 is initiated.

In the W field, the red light by the turning-on of the LED 21 is mixed with the cyan light and the white light by a complementary color is irradiated onto the micro mirror device 16 for a period of time corresponding to 10 degrees in terms of the center angle of the color wheel 242.

As a luminance image corresponding to a white color displayed by the micro mirror device 16, a photo image by only luminance of the white color is formed by its reflection light and is projected toward an external projection object through the projection lens unit 19. The LED 21 is turned off at the same time when this W field is ended.

In the subsequent B field, the blue transmissive diffuser 24B1 instead of the cyan fluorescent reflector 24C is located on the optical axis extending from the laser diodes 20A to 20C by the rotation of the color wheel 242, and thereafter, only the blue transmission light diffused by the blue transmissive diffuser 24B1 is irradiated, as source light, onto the micro mirror device 16 during a period of time of the B field corresponding to 60 degrees in terms of the center angle of the color wheel 242.

At this time, as an image corresponding to a blue color is displayed by the micro mirror device 16, a blue photo image is formed by its reflection light and is projected toward an external projection object through the projection lens unit 19.

Thereafter, the B field is ended, and the turning-on of the red light by the LED 21 is again initiated with the generation of the blue light by the laser diodes 20A to 20C and the blue fluorescent reflector 24B2 of the spoke period of time of the color wheel 242 maintained.

In the M field, the red light by the turning-on of the LED 21 is mixed with the blue light in the blue fluorescent reflector 24B2 and the magenta (murex) light by a complementary color is irradiated onto the micro mirror device 16 during a period of time corresponding to 10 degrees in terms of the center angle of the color wheel 242. As an image corresponding to a magenta color is displayed by the micro mirror device 16, a magenta photo image is formed by its reflection light and is projected toward an external projection object through the projection lens unit 19. Even after the M field is ended, the turning-on of the LED 21 is maintained for the next frame.

In this manner, since a period of time during which a complementary image by the color mixture by the simultaneous turning-on of the LED 21 is projected for the spoke time slots which are the boundary time slots for respective time slots during which primary R, G and B images are originally projected is provided, the entire image can be brighter.

In addition, it was intentionally assumed that the fluorescent materials used for the spoke time slots of the color wheel 242 excite colors having a frequency band different from those of adjacent fluorescent materials of the same colors. This makes it possible to obtain source light of a variety of colors without changing an output of a light source side, which may result in higher brightness and excellent color rendering of the entire projection image.

Fifth Modification

Next, a fifth modification according to the embodiment will be described.

In this modification, it is assumed that the data projector apparatus 10, particularly, the light source unit 17, has the same basic configuration as those shown in FIGS. 1 and 2, and explanation thereof will be omitted.

It is here assumed that a time ratio between time slots during which primary R, Y (yellow), G, Y, M (magenta), B and M images constituting one frame of a color image to be projected (hereinafter referred to as "R field, Y field, G field, Y field, M field, B field and M field") is 8.5:12.5:6:1:1:5:2.

In other words, with respect to one rotation of 360 degrees of the color wheel 24 which is being rotated at a constant speed, a time ratio r:y:g:y:m:b:m between the R field, Y field, G field, Y field, M field, B field and M field becomes 85 degrees:125 degrees:60 degrees:10 degrees:10 degrees:50 degrees:20 degrees in terms of a center angle of the color wheel 24.

Figure 11:
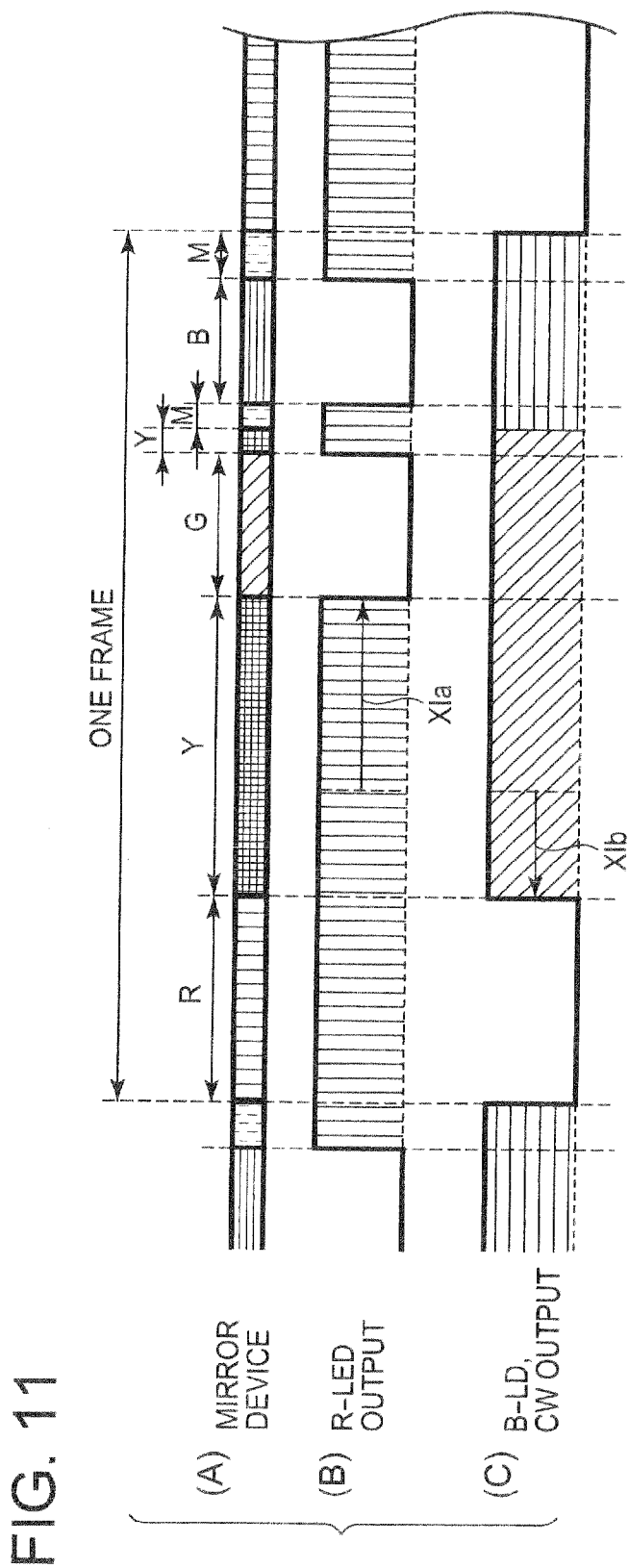
FIG. 11 shows an example of timing charts showing contents of driving processing of the optical system during one image frame in a fifth modification according to the embodiment.

Section (A) of FIG. 11 shows a color of source light irradiated onto the micro mirror device 16. As shown in the figure, a control is performed such that each photo image of the R field, Y field, G field, Y field, M field, B field and M field is formed one by one during a period of time corresponding to one frame.

Section (B) of FIG. 11 shows a turning-on timing of the LED 21 and section (C) of FIG. 11 shows an output timing of source light which is generated through the color wheel (CW) 24 by means of oscillation of the laser diodes (B-LD) 20A to 20C.

As shown in FIG. 3, the color wheel 24 is configured to halve its circumference with the green fluorescent reflector 24G and the blue transmissive diffuser 24B. At the beginning of one frame period of time, in the color wheel 24, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 85 degrees in terms of the center angle of the color wheel 24, the red light is generated by the LED 21 which continues to be turned on from an immediately previous frame, as shown in section (B) of FIG. 11, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 24 is located at a position on their optical axis while the laser diodes 20A to 20C are oscillating, since the oscillation of the laser diodes 20A to 20C is temporarily stopped, the preen light as source light is not generated.

Thereafter, with the LED 21 remaining turned on, the oscillation of the laser diodes 20A to 20C is initiated, and then, a period of time of the Y field corresponding to 125 degrees in terms of the center angle of the color wheel 24 is provided.

Accordingly, the red light by the turning-on of the LED 21 is mixed with the green reflection light excited by the green fluorescent reflector 24G of the color wheel 24 by the oscillation of the laser diodes 20A to 20C after the dichroic mirror 23, and is irradiated, as yellow source light, onto the micro mirror device 16.

At this time, as an image corresponding to a yellow color is displayed by the micro mirror device 16, a yellow photo image is formed by its reflection light and is projected toward an external projection object through the projection lens unit 19.

In a period of time of the subsequent G field, the LED 21 is turned off, the oscillation of the laser diodes 20A to 20C continues, and then, a period of time of the G field corresponding to 60 degrees in terms of the center angle of the color wheel 24 is provided.

At this time, the green reflection light excited by the green fluorescent reflector 24G of the color wheel 24 by the oscillation of the laser diodes 20A to 20C is irradiated, as source light, onto the micro mirror device 16.

Accordingly, as an image corresponding to a green color is displayed by the micro mirror device 16, a green photo image is formed by its reflection light and is projected toward an external projection object through the projection lens unit 19.

Thereafter, when the last portion of the green fluorescent reflector 24G located on the optical axis extending from the laser diodes 20A to 20C, the LED 21 is turned on for a period of time of the Y field corresponding to 10 degrees in terms of the center angle of the color wheel 24, and the red light is combined and irradiated onto the micro mirror device 16.

Accordingly, the red light by the turning-on of the LED 21 is mixed with the green reflection light excited by the green fluorescent reflector 24G of the color wheel 24 by the oscillation of the laser diodes 20A to 20C after the dichroic mirror 23, and is irradiated, as yellow source light, onto the micro mirror device 16.

At this time, as an image corresponding to a yellow color is displayed by the micro mirror device 16, a yellow photo image is formed by its reflection light and is projected toward an external projection object through the projection lens unit 19.

When the color wheel 24 is rotated and, instead of the green fluorescent reflector 24G, the blue transmissive diffuser 24B is located on the optical axis extending from the laser diodes 20A to 20C, a period of time of the M field corresponding to 10 degrees in terms of the center angle of the color wheel 24 is provided, the blue transmission light diffused by the blue transmissive diffuser 24B is mixed with the red light generated from the LED 21 during this M field, and source light of a magenta color which is its complementary color is irradiated onto the micro mirror device 16.

At this time, as an image corresponding to a magenta color is displayed by the micro mirror device 16, a magenta photo image is formed by its reflection light and is projected toward an external projection object through the projection lens unit 19. The LED 21 is turned off at the same time as the M field is ended.

In the subsequent B field, only the blue transmission light diffused by the blue transmissive diffuser 24B is irradiated, as source light, onto the micro mirror device 16 during a period of time corresponding to 50 degrees in terms of the center angle of the color wheel 24.

At this time, as an image corresponding to a blue color is displayed by the micro mirror device 16, a blue photo image is formed by its reflection light and is projected toward an external projection object through the projection lens unit 19.

Thereafter, the B field is ended, the M field is again provided, and the turning-on of the red light by the LED 21 is initiated. In this M field, the red light by the turning-on of the LED 21 is mixed with the blue light transmitted through the blue transmissive diffuser 24B during a period of time corresponding to 20 degrees in terms of the center angle of the color wheel 24, and the magenta light by a complementary color is irradiated onto the micro mirror device 16.

As an image corresponding to a magenta color is displayed by the micro mirror device 16, a magenta photo image is formed by its reflection light and is projected toward an external projection object through the projection lens unit 19. Even after this M field is ended, the turning-on of the LED 21 is maintained for the next frame.

In this manner, by controlling the turning-on timing of the LED 21 and the oscillation timing of the laser diodes 20A to 20C in synchronization with the rotation of the color wheel 24 on which the green fluorescent reflector 24G and the blue transmissive diffuser 24B are formed, the red light by the turning-on of the LED 21 alone, the yellow light by the mixture of the red light by the turning-on of the LED 21 and the green light by the oscillation of the laser diodes 20A to 20C, and the green light, yellow light, magenta light, blue light and magenta light by the oscillation of the laser diodes 20A to 20C alone are cyclically generated in a time division manner and are irradiated onto the micro mirror device 16.

In particular, in order to obtain the yellow light by a mixed color (complementary color) using both the LED 21 and the laser diodes 20A to 20C, the period of time of the turning-on of the LED 21 and the period of time of the oscillation of the laser diodes 20A to 20C were set to extend over those shown in FIG. 4, as indicated by arrows XIa and XIb in FIG. 11, respectively. In addition, both of the LED 21 and the laser diodes 20A to 20C were used for spoke time slots which are switching time slots for R, Y, G and B. This allows the entire projection image to be brighter.

Sixth Modification

Next, a sixth modification according to the embodiment will be described.

In this modification, it is assumed that the data projector apparatus 10, particularly, the light source unit 17, has the same basic configuration as those shown in FIGS. 1 and 2, and explanation thereof will be omitted.

Here, boundary time slots (hereinafter referred to as "spoke time slots") are provided for respective time slots during which primary R, Y (yellow), G and B images constituting one frame of a color image to be projected are projected (hereinafter referred to as "R field, Y field, G field and B field"), with one frame being constituted by 8 R, W (white) 1, Y, W2, G, W3, B and W4 fields in total, and it is assumed that a time ratio between the R, W1, Y, W2, G, W3, B and W4 fields is 8.5:2:8.5:2:6:2:5:2.

In other words, as will be described later, with respect to one rotation of 360 degrees of the color wheel 243 which is being rotated at a constant speed, a time ratio r:w1:y:w2:g:w3:b:w4 between the R field, W1 field, Y field, W2 field, G field, W3 field, B field and W4 field becomes 85 degrees:20 degrees:83 degrees:20 degrees:60 degrees:20 degrees 50 degrees:20 degrees in terms of a center angle of the color wheel 243.

Figure 12:
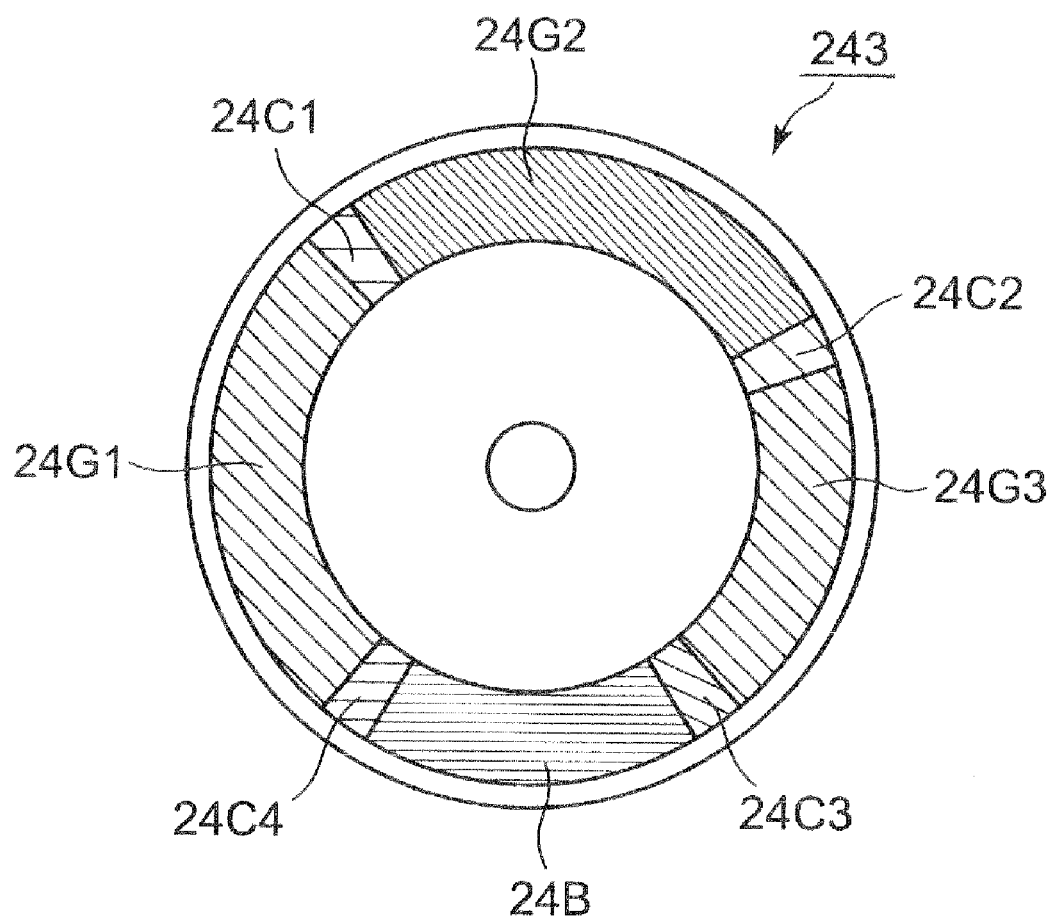
FIG. 12 is a plan view showing a configuration of a color wheel in a sixth modification according to the embodiment.

FIG. 12 shows a configuration of a color wheel 243 replacing the color wheel 24. As shown in the same figure, on the color wheel 243, one ring is formed with a combination of, for example, a green fluorescent reflector 24G1 of an arc form having a center angle of 85 degrees, a cyan fluorescent reflector 24C1 of a center angle of 20 degrees, a green fluorescent reflector 24G2 of a center angle of 85 degrees, a cyan fluorescent reflector 24C2 of a center angle of 20 degrees, a green fluorescent reflector 24G3 of a center angle of 60 degrees, a cyan fluorescent reflector 24C3 of a center angle of 20 degrees, a blue transmissive diffuser 24B of a center angle of 50 degrees and a cyan fluorescent reflector 24C4 of a center angle of 20 degrees.

When the green fluorescent reflector 24G1 and the green fluorescent reflector 24G3, which have the same optical characteristic, are placed at a position to be irradiated with the blue light emitted from the laser diodes 20A to 20C, the reflectors are excited to emit green light having a wavelength range with a center wavelength of, for example, about 530 [nm], by the irradiation, and the excited green light is reflected by the color wheel 243 and then the dichroic mirror 23 through the lens group 44.

When the green fluorescent reflector 24G2 is placed at a position to be irradiated with the blue light emitted from the laser diodes 20A to 20C, the reflector is excited to emit green light having a wavelength range with a center wavelength of, for example, about 560 [nm], by the irradiation, and the excited green light is reflected by the color wheel 243 and then the dichroic mirror 23 through the lens group 44.

When the blue transmissive diffuser 24B is placed at a position to be irradiated with the blue light emitted from the laser diodes 20A to 20C, blue light having an oscillating wavelength of, for example, about 450 [nm] of the laser diodes 20A to 20C is diffused and transmitted. The transmitting blue light is also transmitted through the dichroic mirror 28 through the mirrors 26 and 27.

The cyan fluorescent reflectors 24C1 to 24C4 are interposed between the green fluorescent reflectors 24G1 to 24G3 and blue transmissive diffuser 24B, respectively, and are arranged to increase brightness of a projection image mainly for a short time of their respective boundary time slots (hereinafter referred to as "spoke time slots").

However, these cyan fluorescent reflectors 24C1 to 24C4 are formed of fluorescent materials which are beforehand selected to have different wavelength bands of cyan light excited and emitted when blue light from the laser diodes 20A to 20C is irradiated thereon.

Figure 13:
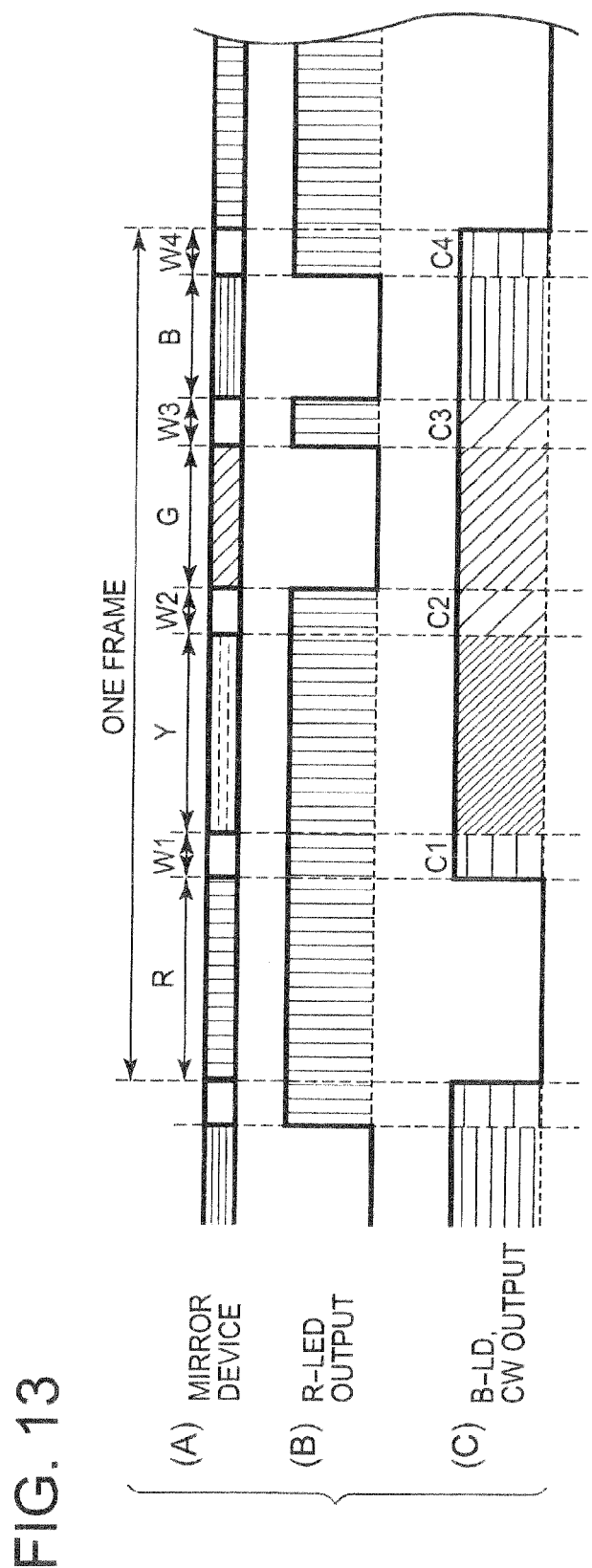
FIG. 13 shows an example of timing charts showing contents of driving processing of the optical system during one image frame in the sixth modification according to the embodiment.

Section (A) of FIG. 13 shows a color of source light irradiated onto the micro mirror device 16. As shown in the figure, a control is performed such that each photo image of the P field, W1 field, Y field, W2 field, G field, W3 field, B field and W4 field is formed one by one during a period of time corresponding to one frame.

Section (B) of FIG. 13 shows a turning-on timing of the LED 21 and section (C) of FIG. 13 shows an output timing of source light which is generated through the color wheel (CW) 243 by means of oscillation of the laser diodes (B-LD) 20A to 20C.

As shown in FIG. 12, the color wheel 243 is configured to divide its circumference into 8 parts with the green fluorescent reflector 24G1, the cyan fluorescent reflector 24C1, the green fluorescent reflector 24G2, the cyan fluorescent reflector 24C2, the green fluorescent reflector 24G3, the cyan fluorescent reflector 24C3, the blue transmissive diffuser 24B and the cyan fluorescent reflector 24C4.

At the beginning of one frame period of time, in the color wheel 243, rotation of the motor 25 is controlled, by the projection light processor 31 such that a position at which the cyan fluorescent reflector 24C4 is switched to the green fluorescent reflector 24G1 is located on an optical axis extending from the laser diodes 20A to 20C.

At the beginning of one frame, during a period of time of the R field corresponding to 85 degrees in terms of the center angle of the color wheel 243, the red light is generated by the LED 21 which continues to be turned on from an immediately previous frame, as shown in section (B) of FIG. 13, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G1 of the color wheel 243 is located at a position on their optical axis while the laser diodes 20A to 20C are oscillating, since the oscillation of the laser diodes 20A to 20C is temporarily stopped, the green light as source light is not generated.

Thereafter, with the LED 21 remaining turned on, the oscillation of the laser diodes 20A to 20C is initiated, and then, the cyan reflection light excited by the cyan fluorescent reflector 24C1 is also irradiated, as source light, onto the micro mirror device 16 for a period of time of the W1 field corresponding to 20 degrees in terms of the center angle of the color wheel 243.

At this time, after the dichroic mirror 23, the red light by the turning-on of the LED 21 is mixed with the cyan light excited by the cyan fluorescent reflector 24C1, and white light by a complementary color is irradiated onto the micro mirror device 16.

As a luminance image corresponding to a white color is displayed by the micro mirror device 16, a white photo image is formed by its reflection light and is projected toward an external projection object through the projection lens unit 19.

After this short W1 field, while the generation of the red light by the turning-on of the LED 21 is maintained, the green fluorescent reflector 24G2 is instead located on the optical axis in the color wheel 243 to generate new green light. Thereafter, the red light from the LED 21 and the green reflection light excited by the green fluorescent reflector 24G2 are irradiated, as source light, onto the micro mirror device 16 for a period of time of the Y field corresponding to 85 degrees in terms of the center angle of the color wheel 243.

At this time, after the dichroic mirror 23, the red light by the turning-on of the LED 21 is mixed with the green light excited by the green fluorescent reflector 24G2, and yellow light by a complementary color is irradiated onto the micro mirror device 16. As an image corresponding to a yellow color is displayed by the micro mirror device 16, a yellow photo image is formed by its reflection light and is projected toward an external projection object through the projection lens unit 19.

Thereafter, with the LED 21 remaining turned on, the oscillation of the laser diodes 20A to 20C is also maintained, and then, the cyan reflection light excited by the cyan fluorescent reflector 24C2 is also irradiated, as source light, onto the micro mirror device 16 for a period of time of the W2 field corresponding to 20 degrees in terms of the center angle of the color wheel 243.

At this time, after the dichroic mirror 23, the red light by the turning-on of the LED 21 is mixed with the cyan light excited by the cyan fluorescent reflector 24C2, and white light by a complementary is irradiated onto the micro mirror device 16. As a luminance image corresponding to a white color is displayed by the micro mirror device 16, a white photo image is formed by its reflection light and is projected toward an external projection object through the projection lens unit 19.

After completion of this short W2 field, the LED 21 which generates the red light is turned off, and the green fluorescent reflector 24G3 is instead located on the optical axis in the color wheel 243 to generate new green light.

Thereafter, only the green reflection light excited by the green fluorescent reflector 24G3 is irradiated, as source light, onto the micro mirror device 16 for a period of time of the G field corresponding to 60 degrees in terms of the center angle of the color wheel 243.

As an image corresponding to a green color is displayed by the micro mirror device 16, a green photo image is formed by its reflection light and is projected toward an external projection object through the projection lens unit 19.

In addition, after the G field is ended, the cyan light by the cyan fluorescent reflector 24C3 is generated by the laser diodes 20A to 20C and the color wheel 243, and the turning-on of the red light by the LED 21 is again initiated.

In the W3 field, the red light by the turning-on of the LED 21 is mixed with the cyan light and white light by complementary color is irradiated onto the micro mirror device 16 for a period of time corresponding to 20 degrees in terms of the center angle of the color wheel 243.

As a luminance image corresponding to a white color is displayed by the micro mirror device 16, a white photo image is formed solely in accordance with the brightness of the white by its reflection light and is projected toward an external projection object through the projection lens unit 19. The LED 21 is turned off at the same time when the W3 field is ended.

In the subsequent B field, the blue transmissive diffuser 24B instead of the cyan fluorescent reflector 24C3 is located on the optical axis extending from the laser diodes 20A to 20C by the rotation of the color wheel 243, and thereafter, only the blue transmission light diffused by the blue transmissive diffuser 24B is irradiated, as source light, onto the micro mirror device 16 during a period of time of the B field corresponding to 50 degrees in terms of the center angle of the color wheel 243.

At this time, as an image corresponding to a blue color is displayed by the micro mirror device 16, a blue photo image is formed by its reflection light and is projected toward an external projection object through the projection lens unit 19.

Thereafter, the B field is ended, and the turning-on of the red light by the LED 21 is again initiated with the generation of the cyan light by the laser diodes 20A to 20C and the cyan fluorescent reflector 24C4 of the spoke period of time of the color wheel 243 maintained.

In the W4 field, the red light by the turning-on of the LED 21 is mixed with the cyan light in the cyan fluorescent reflector 24C4 and the white light by a complementary color is irradiated onto the micro mirror device 16 during a period of time corresponding to 20 degrees in terms of the center angle of the color wheel 24.

As a luminance image corresponding to a white color is displayed by the micro mirror device 16, a white photo image is formed by its reflection light and is projected toward an external projection object through the projection lens unit 19. Even after the W4 field is ended, the turning-on of the LED 21 is maintained for the next frame.

In this manner, since a period of time during which a complementary image by the color mixture by the simultaneous turning-on of the LED 21 is projected for the spoke time slots which are the boundary time slots for respective time slots during which primary R, Y, P and B images are originally projected is provided, the entire image can be brighter.

In addition, although the cyan fluorescent reflectors 24C1 to 24C4 used for the spoke time slots of the color wheel identical in that they have the same cyan color, to be precise, it was assumed that they excite colors having different frequencies. This makes it possible to obtain source light of a variety of colors without changing an output of a light source side, which may result in higher brightness and excellent color rendering of the entire projection image.

Seventh Modification

Next, a seventh modification according to the embodiment will be described.

In this modification, it is assumed that the data projector apparatus 10, particularly, the light source unit 17, has the same basic configuration as those shown in FIGS. 1 and 2, and explanation thereof will be omitted.

Here, four fields in the total of time slots during which primary R, G, Y (yellow) and B images constituting one frame of a color image are projected (hereinafter referred to as "R field, G field, Y field and B field") are provided, and it is assumed that a time ratio between the R, G, Y and B fields is 10.5:10.5:8:7.

In other words, with respect to one rotation of 360 degrees of the color wheel 24 shown in FIG. 3, which is being rotated at a constant speed, a time ratio r:g:y:b between R field, G field, Y field and B field becomes 105 degrees:105 degrees:80 degrees:70 degrees in terms of a center angle of the color wheel 24.

Figure 14:
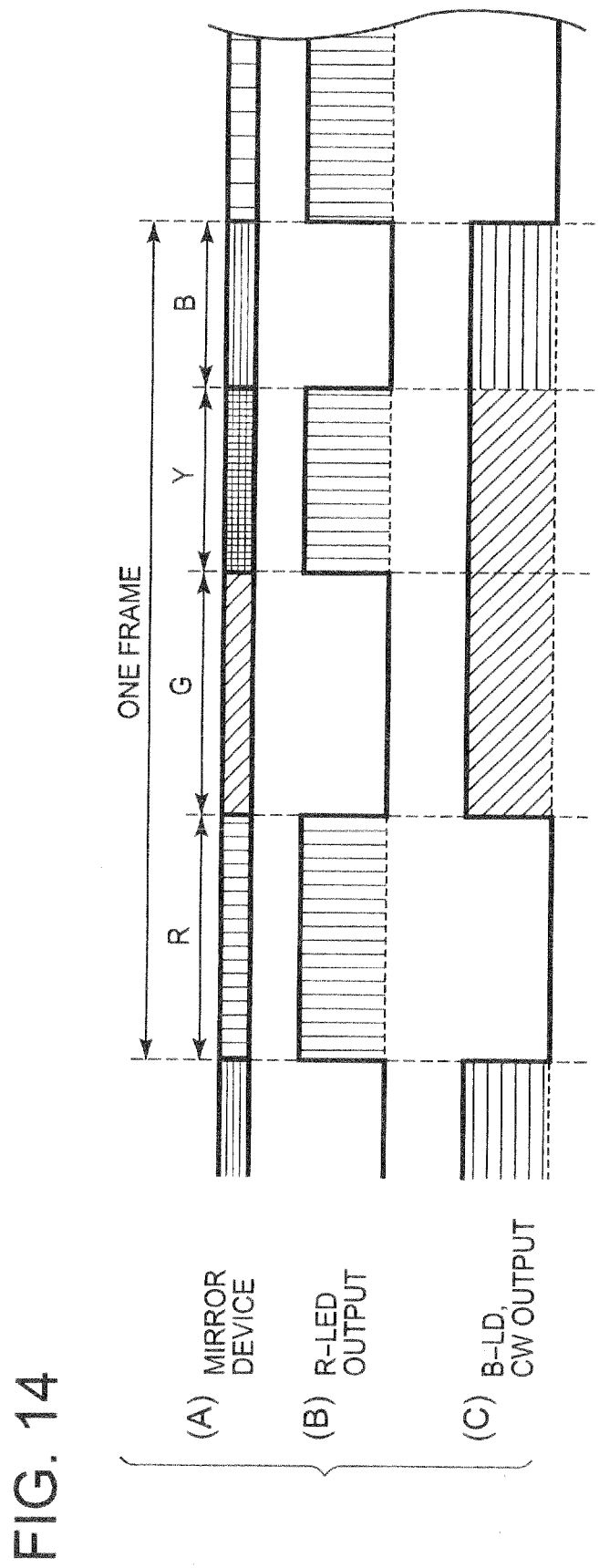
FIG. 14 shows an example of timing charts showing contents of driving processing of the optical system during one image frame in a seventh modification according to the embodiment.

Section (A) of FIG. 14 shows a color of source light irradiated onto the micro mirror device 16. As shown in the figure, a control is performed such that each photo image of the R field, G field, Y field and B field is formed one by one during a period of time corresponding to one frame.

Section (B) of FIG. 14 shows a turning-on timing of the LED 21 and section (C) of FIG. 14 shows an output timing of source light which is generated through the color wheel (CW) 24 by means of oscillation of the laser diodes (B-LD) 20A to 20C.

As shown in FIG. 3, the color wheel 24 is configured to halve its circumference with the green fluorescent reflector 24C and the blue transmissive diffuser 24B. At the beginning of one frame period of time, in the color wheel 24, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 105 degrees in terms of the center angle of the color wheel 24, only the red light is generated by the turning-on of the LED 21, as shown in section (B) of FIG. 14, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 24 is located at a position on their optical axis while the laser diodes 20A to 20C are oscillating, since the oscillation of the laser diodes 20A to 20C is temporarily stopped, the green light as source light is not generated.

Thereafter, in the G field, the LED 21 is turned off, the oscillation of the laser diodes 20A to 20C is initiated, and then, a period of time of the G field corresponding to 105 degrees in terms of the center angle of the color wheel 24 is provided.

At this time, the green reflection light excited by the green fluorescent reflector 24G of the color wheel 24 by the oscillation of the laser diodes 20A to 20C is irradiated, as source light, onto the micro mirror device 16.

Accordingly, as an image corresponding to a green color is displayed by the micro mirror device 16, a green photo image is formed by reflection light and is projected toward an external projection object through the projection lens unit 19.

Subsequently, the turning-on of the LED 21 is again initiated with the oscillation of the laser diodes 20A to 20C maintained, and then, a period of time of the Y field corresponding to 80 degrees in terms of the center angle of the color wheel 24 is provided.

At this time, the red light by the turning-on of the LED 21 is mixed with the green reflection light excited by the green fluorescent reflector 24G of the color wheel 24 by the oscillation of the laser diodes 20A to 20C after the dichroic mirror 23, and is irradiated, as yellow source light, onto the micro mirror device 16.

At this time, as an image corresponding to a yellow color is displayed by the micro mirror device 16, a green photo image is formed by its reflection light and is projected toward an external projection object through the projection lens unit 19.

Thereafter, while the LED 21 is turned off and the generation of the red light is stopped again, when the color wheel 24 is rotated and, instead of the green fluorescent reflector 24G, the blue transmissive diffuser 24B is located on the optical axis extending from the laser diodes 20A to 20C, a period of time of the B field corresponding to 70 degrees in terms of the center angle of the color wheel 24 is provided and the blue transmission light diffused by the blue transmissive diffuser 24B is irradiated, as source light, onto the micro mirror device 16 during this period of time of the B field.

At this time, as an image corresponding to a blue color is displayed by the micro mirror device 16, a blue photo image is formed by its reflection light and is projected toward an external projection object through the projection lens unit 19.

Thereafter, the B field and the one frame period of time are ended, the green fluorescent reflector 24G, instead of the blue transmissive diffuser 24B, is again located on the optical axis extending from the laser diodes 20A to 20C, the oscillation of the laser diodes 20A to 20C is temporarily stopped, and the LED 21 is again turned on to provide a period of time of the R field of the next frame.

In this manner, by controlling the turning-on timing of the LED 21 and the oscillation timing of the laser diodes 20A to 20C in synchronization with the rotation of the color wheel 24 on which the green fluorescent reflector 24G and the blue transmissive diffuser 24B are formed, the red light by the turning-on of the LED 21 alone, the green light by the oscillation of the laser diodes 20A to 20C alone, the yellow light by the mixture of the red light by the turning-on of the LED 21 and the green light by the oscillation of the laser diodes 20A to 20C, and the blue light are cyclically generated in a time division manner and are irradiated onto the micro mirror device 16.

In particular, in order to obtain the yellow light by a mixed color (complementary color) using both the LED 21 and the laser diodes 20A to 20C, the period of time of the turning of the LED 21 and the period of time of the oscillation of the laser diodes 20A to 20C were set to extend over those shown in FIG. 4, as indicated by arrows Va and Vb in FIG. 5, respectively. This allows the entire projection image to be brighter.

In addition, taking into account the turning-on period of the LED 21 shown in section (B) of FIG. 14, the turning-on and turning-off of the LED 21 are performed with two cycles for two fields of the R field and Y field in total, which require the turning-on of the LED 21 to be during one frame.

In this manner, by increasing a driving frequency of the LED 21 and reducing continuous turning-on time intentionally, it is possible to maintain an emission driving with a stable and high luminance in consideration of characteristic of the LED 21 that an emission luminance is lowered due to heat resistance by the continuous driving.

Eighth Modification

Next, an eighth modification according to the embodiment will be described.

In this modification, it is assumed that the data projector apparatus 10, particularly, the light source unit 17, has the same basic configuration as those shown in FIGS. 1 and 2, and explanation thereof will be omitted.

Here, four fields in total of time slots during which primary R, G, M (magenta) and B images constituting one frame of a color image to be projected (hereinafter referred to as "R field, G field, M field and B field") are provided, and it is assumed chat a time ratio between the R, G, M and B fields is 10.5:10.5:8:7.

In other words, as will be described later, with respect to one rotation of 360 degrees of the color wheel 244 which is being rotated at a constant speed, a time ratio r:g:m:b between the R field, G field, M field and B field becomes 105 degrees: 105 degrees:80 degrees:70 degrees in terms of a center angle of the color wheel 244.

Figure 15:
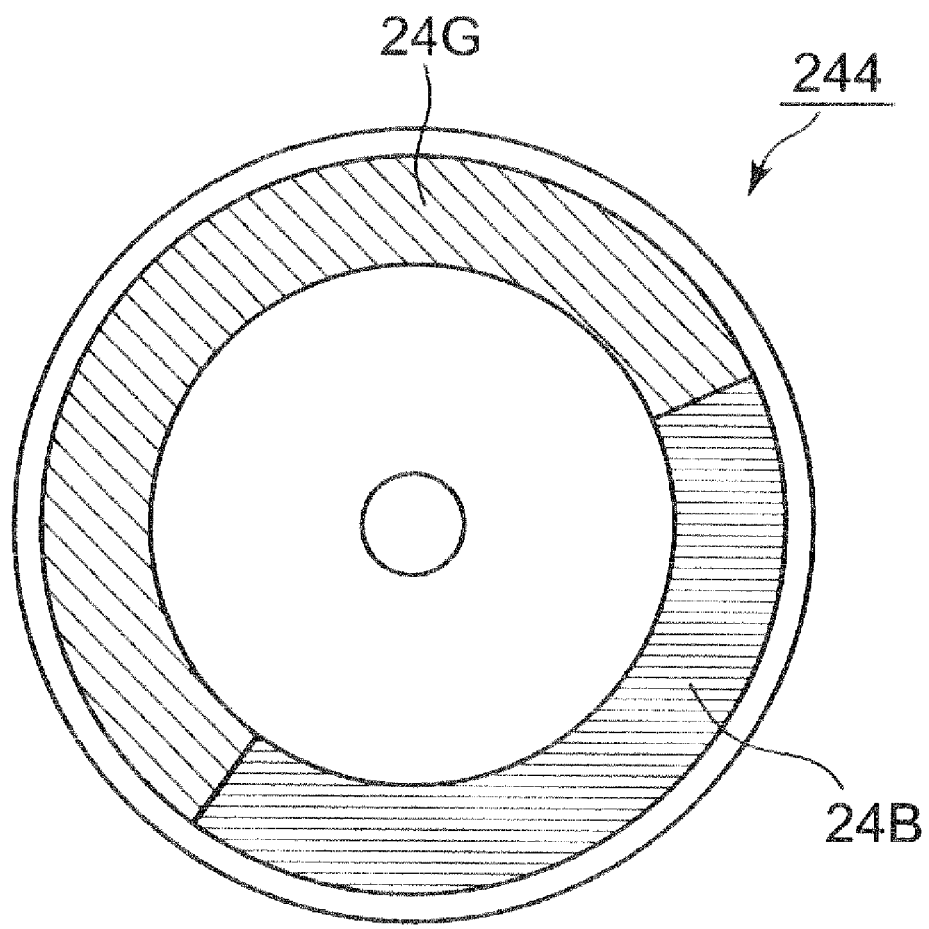
FIG. 15 is a plan view showing a configuration of a color wheel in an eighth modification according to the embodiment.

FIG. 15 shows a configuration of the color wheel 244 replacing the color wheel 24. As shown in the same figure, on the color wheel 244, one ring is formed with a combination of, for example, a green fluorescent reflector 24G of an arc form having a center angle of 210 degrees and a blue transmissive diffuser 24B of an arc form having a center angle of 150 degrees.

When the green fluorescent reflector 24G is placed at a position to be irradiated with the blue light emitted from the laser diodes 20A to 20C, the reflector is excited to emit green light having a wavelength range with a center wavelength of, for example, about 530 [nm], by the irradiation, and the excited green light is reflected by the color wheel 244 and then the dichroic mirror 23 through the lens group 44.

When the blue transmissive diffuser 24B is placed at a position to be irradiated with the blue light emitted from the laser diodes 20A to 20C, blue light having an oscillating wavelength of, for example, about 450 [nm] of the laser diodes 20A to 20C is diffused and transmitted, and the transmitted blue light is transmitted through the dichroic mirror 28 through the mirrors 26 and 27.

Section (A) of FIG. 16 shows a color of source light irradiated onto the micro mirror device 16 shown in the figure, a control is performed such that each photo image of the R field, G field, M field and B field is formed one by one during a period of time corresponding to one frame.

Section (B) of FIG. 16 shows a turning-on timing of the LED 21 and section (C) of FIG. 16 shows an output timing of source light which is generated through the color wheel (CW) 244 by means of oscillation of the laser diodes (B-LD) 20A to 20C.

As shown in FIG. 15, the color wheel 244 is configured to halve its circumference with the green fluorescent reflector 24G and the blue transmissive diffuser 24B. At the beginning of one frame period of time, in the color wheel 244, rotation of the motor 25 is controlled by the projection light processor 31 such that a position at which the blue transmissive diffuser 24B is switched to the green fluorescent reflector 24G is located on an optical axis extending from the laser diodes 20A to 20C.

At the beginning of one frame, during a period of time of the R field corresponding to 105 degrees in terms of the center angle of the color wheel 244, only the red light is generated by the turning-on of the LED 21, as shown in section (B) of FIG. 16, and is irradiated onto the micro mirror device 16.

At this time, as an image corresponding to a red color is displayed by the micro mirror device 16, a red photo image is formed by its reflection light and is projected toward an external projection object through the projection lens unit 19.

The oscillation of the laser diodes 20A to 20C is temporarily stopped. For that reason, although the green fluorescent reflector 24G of the color wheel 244 is located at a position on their optical axis while the laser diodes 20A to 20C are oscillating, since the oscillation of the laser diodes 20A to 20C is temporarily stopped, the green light as source light is not generated.

Thereafter, in the G field time period, the LED 21 is turned off, the oscillation of the laser diodes 20A to 20C is initiated, and then, a period of time of the G field corresponding to 105 degrees in terms of the center angle of the color wheel 244 is provided.

At this time, the green reflection light excited by the green fluorescent reflector 24G of the color wheel 244 by the oscillation of the laser diodes 20A to 20C is irradiated, as source light, onto the micro mirror device 16.

Accordingly, as an image corresponding to a green color is displayed by the micro mirror device 16, a green photo image is formed by its reflection light, and is projected toward an external projection object through the projection lens unit 19.

Subsequently, the turning-on of the LED 21 is again initiated with the oscillation of the laser diodes 20, to 20C maintained. In the color wheel 244, instead of the green fluorescent reflector 24G, the blue transmissive diffuser 24B is located on the optical axis extending from the laser diodes 20A to 20C, and a period of time of the M field corresponding to 80 degrees in terms of the center angle of the color wheel 24 is provided.

At this time, the red light by the turning-on of the LED 21 is mixed with the blue light which is transmitted through the blue transmissive diffuser 24B of the color wheel 244 by the oscillation of the laser diodes 20A to 20C after the dichroic mirror 28, and is irradiated, as magenta source light, onto the micro mirror device 16.

At this time, as an image corresponding to a magenta color is displayed by the micro mirror device 16, a magenta photo image is formed by its reflection light and is projected toward an external projection object through the projection lens unit 19.

Thereafter, the LED 21 is turned off to stop the generation of the red light again, a period of time of the B field corresponding to 70 degrees in terms of the center angle of the color wheel 244 is provided, and only the blue transmission light diffused by the blue transmissive diffuser 24B is irradiated, as source light, the micro mirror device 16 during this period of time of the B field.

At this time, as an image corresponding to a blue color is displayed by the micro mirror device 16, a blue photo image is formed by its reflection light and is projected toward an external projection object through the projection lens unit 19.

Thereafter, the B field and the one frame period of time are ended, the green fluorescent reflector 24G, instead of the blue transmissive diffuser 24B, is again located on the optical axis extending from the laser diodes 20A to 20C, the oscillation of the laser diodes 20A to 20C is temporarily stopped, and the LED 21 is again turned on to provide a period of time of the R field of the next frame.

In this manner, by controlling the turning-on timing of the LED 21 and the oscillation timing of the laser diodes 20A to 20C in synchronization with the rotation of the color wheel 244 on which the green fluorescent reflector 24G and the blue transmissive diffuser 24B are formed, the red light by the turning-on of the LED 21 alone, the green light by the oscillation of the laser diodes 20A to 20C alone, the magenta light by the mixture of the red light by the turning-on of the LED 21 and the blue light by the oscillation of the laser diodes 20A to 20C, and the blue light are cyclically generated in a time division manner and are irradiated onto the micro mirror device 16.

In particular, taking into account the turning-on period of the LED 21 shown in section (B) of FIG. 16, the turning-on and turning-off of the LED 21 are performed with two cycles for two fields of the R field and M field in total, which require the turning-on of the LED 21 to be during one frame.

In this manner, by increasing a driving frequency of the LED 21 and reducing continuous turning-on time intentionally, it is possible to maintain an emission driving with a stable and high luminance in consideration of characteristic of the LED 21 that an emission luminance is lowered due to heat resistance by the continuous driving.

In addition, although it has been illustrated in the above embodiment that the blue light and the green light are generated by the color wheels 24 (241 to 244) by oscillating the blue laser light by means of the laser diodes 20A to 20C and the red light is generated by the LED 21, the present invention is not limited thereto but may be equally applied to a light source unit using various kinds of light sources and a video projector using such a light source unit, such as compensating for a luminance balance of primary color light, which may be generated from a single light source and is not suitable for practical use, by using a different light source.

In addition, although it has been illustrated in the above embodiment that the present invention is applied to the DLP (registered trade mark) type data projector apparatus, the present invention may be equally applied to a liquid crystal projector or the like which forms a photo image using, for example, transmission type monochrome liquid crystal panel.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments and modifications described above. For example, some component may be deleted from all components shown in the embodiments. Further, the components in different embodiments and modifications may be used appropriately in combination.

What is claimed is:

1. A light source device comprising:
   a first light source configured to emit a first source light in a first wavelength range;
   a source light modulator comprising a first face, a second face through which the first source light enters the source light modulator, a first area, and a second area, wherein the first area is configured to have the first source light having entered through the second face pass therethrough, and to output a transmitted light from the first face, and wherein the second area comprises a phosphor layer and is configured to reflect a reflected light excited by fluorescence excitation in a wavelength different from the first wavelength range by being irradiated by the first source light having entered through the second face, and to output the reflected light from the second face;
   a second light source configured to emit a second source light in a second wavelength range that is different from the first wavelength range;
   an integrator configured to uniformalize luminescence distribution of light input through a light incidence face thereof; and
   a light guiding optical system configured to guide the transmitted light, the reflected light, and the second source light to the light incidence face of the integrator,
   wherein the light guiding optical system comprises:
      a first dichroic mirror disposed between the first light source and the source light modulator, the first dichroic mirror being configured to allow the first source light and the second source light to pass therethrough and to reflect the reflected light; and
      a second dichroic mirror configured to reflect the second source light and the reflected light and to allow the transmitted light to pass through.

2. The light source device according to claim 1, wherein the first source light and the transmitted light are a blue light.

3. The light source device according to claim 1,
   wherein the phosphor layer emits a green light as the reflected light when the first source light is irradiated and excited, and
   wherein the second light source is configured to emit a red light as the second source light.

4. The light source device according to claim 1,
   wherein the light guiding optical system is configured to share an optical component for the second source light that passed through the first dichroic mirror and the reflected light that is reflected by the first dichroic mirror, and
   wherein the optical component comprises a collector lens configured to collect the second source light, the transmitted light, and the reflected light to the light incidence face of the integrator.

5. The light source device according to claim 4, wherein the light guiding optical system is configured such that:
   a total magnification of optical components disposed in an optical path of the second source light to the integrator is set to be a magnification for fitting a light emitting area of the second light source to the light incidence face of the integrator; and
   a total magnification of optical components disposed in an optical path of the reflected light to the integrator is set to be a magnification for fitting an irradiation area of the first source light on the source light modulator to the light incidence face of the integrator.

6. The light source device according to claim 1,
   wherein the light guiding optical system further comprises:
      a first lens disposed near the first face of the source light modulator, the first lens being configured to collect the transmitted light output from the first face; and
      a second lens disposed near the second face of the source light modulator, the second lens being configured to collect the reflected light output from the second face.

7. The light source device according to claim 6, wherein the first lens is configured to have a size smaller than a size of the second lens.

8. The light source device according to claim 6, wherein the second lens comprises a plurality of lenses.

9. The light source device according to claim 1, further comprising:
   a motor configured to rotate the source light modulator,
   wherein the motor is attached to the source light modulator on a side of the first face of the source light modulator.

10. A video projector comprising:
    a light source device according to claim 1;
    a video interface configured to receive a video signal; and
    a projector unit configured to generate, from output source light output from the light source device, a color photo image in accordance with the video signal, and to project the color photo image.

11. A light source device comprising:
    a first light source configured to emit a first source light in a first wavelength range;
    a source light generator configured to generate a source light having time varying color using the first source light;
    a second light source configured to emit a second source light in a second wavelength range that is different from the first wavelength range;
    a light source controller configured to control the first light source and the second light source to cyclically select one of the source light having time varying color and the second source light to be output as an output source light, wherein the first light source emits a laser light having a blue wavelength range as the first source light, wherein the source light generator comprises a color wheel having a green fluorescence reflection portion and a diffusion transmission portion which are arranged in a circumferential direction of the color wheel, the green fluorescence reflection portion comprising a phosphor that emits light having a green wavelength range using the laser light as an excitation light, the diffusion transmission portion diffusing and transmitting the laser light, wherein the second light source comprises a light emitting diode configured to emit light having a red wavelength range as the second source light, and wherein the light source device further comprises:
   a first dichroic mirror configured to (i) transmit the laser light having the blue wavelength range that is emitted by the first light source, (ii) reflect the light having the green wavelength range that is emitted by the phosphor, and (iii) transmit the light having the red wavelength range that is emitted by the second light source; and
   a second dichroic mirror configured to (i) transmit the laser light that is transmitted through the diffusion transmission portion of the color wheel, (ii) reflect the light having the green wavelength range that is reflected by the first dichroic mirror, and (iii) reflect the light having the red wavelength range that is transmitted through the first dichroic mirror.

12. A video projector comprising:
a light source device according to claim 11;
a video interface configured to receive a video signal; and
a projector unit configured to generate, from the output source light, a color photo image in accordance with the video signal and project the color photo image.

13. The video projector according to claim 12,
wherein the light source controller is configured to control a driving timing for turning on and off each of the first light source and the second light source to partially overlap a color-varying source light of at least one color from the source light having time varying color and the second source light so as to generate the output source light, having a mixed color of the color-varying source light and the second source light, and
wherein the projector unit is configured to generate and project the color photo image in accordance with the color of the output source light in synchronization with a timing at which the output source light is turned on.

14. The video projector according to claim 13, wherein the light source controller is configured to control the driving timing so as to temporally separate a first time period during which the second source light is exclusively emitted and a second time period during which both the first source light and the second source light are emitted.

15. The video projector according to claim 13, wherein the light source controller is configured to control the driving timing to overlap the color-varying source light and the second source light in synchronization with a timing at which the color of the color-varying source light is changed so as to generate the output source light having the mixed color.

* * * * *